United States Patent
Lopez et al.

(10) Patent No.: US 11,041,579 B2
(45) Date of Patent: Jun. 22, 2021

(54) AUTOMATED OPERATION OF WELLSITE EQUIPMENT

(71) Applicant: SCHLUMBERGER TECHNOLOGY CORPORATION, Sugar Land, TX (US)

(72) Inventors: Miguel Angel Lopez, Sugar Land, TX (US); Marcos Suguru Kajita, Houston, TX (US); Nan Mu, Singapore (SG); Chuong Nguyen, Richmond, TX (US); Corey Ray, Houston, TX (US); Manuel Alfonso Bobadilla Larios, Stafford, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 15/557,140

(22) PCT Filed: Mar. 8, 2016

(86) PCT No.: PCT/US2016/021336
§ 371 (c)(1),
(2) Date: Sep. 11, 2017

(87) PCT Pub. No.: WO2016/144939
PCT Pub. Date: Sep. 15, 2016

(65) Prior Publication Data
US 2018/0045331 A1    Feb. 15, 2018

Related U.S. Application Data

(60) Provisional application No. 62/130,045, filed on Mar. 9, 2015, provisional application No. 62/130,174, filed
(Continued)

(51) Int. Cl.
*F16K 31/02* (2006.01)
*F16K 37/00* (2006.01)
(Continued)

(52) U.S. Cl.
CPC .......... *F16K 37/0091* (2013.01); *E21B 41/00* (2013.01); *F16K 11/22* (2013.01);
(Continued)

(58) Field of Classification Search
CPC ...... F16K 37/0091; F16K 11/22; E21B 41/00; F17D 1/04; F17D 1/07; F17D 3/01;
(Continued)

(56) References Cited

U.S. PATENT DOCUMENTS

| | | |
|---|---|---|
| 4,821,564 A | 4/1989 | Pearson et al. |
| 2004/0140092 A1 | 7/2004 | Robison |

(Continued)

FOREIGN PATENT DOCUMENTS

| | | |
|---|---|---|
| WO | 2013133874 A1 | 9/2013 |
| WO | 2014158806 A1 | 10/2014 |

OTHER PUBLICATIONS

International Search Report and Written Opinion issued in International Patent Appl. No. PCT/US2016/043217 dated Nov. 3, 2016; 14 pages.

(Continued)

*Primary Examiner* — Minh Q Le
(74) *Attorney, Agent, or Firm* — Michael L. Flynn

(57) ABSTRACT

Systems and method for controlling wellsite equipment, including pumps and a manifold having a low-pressure (LP) manifold, having LP ports with LP valves, and a high-pressure (HP) manifold, having HP ports with HP valves and bleed ports with bleed valves. The pumps are fluidly coupled with the LP manifold via LP conduits and with the HP manifold via HP conduits. Communication is established between a controller and the LP valves, the HP valves, the bleed valves, the pumps, and sensors for monitoring pressure within the HP conduits. The controller is operable to, with respect to each pump, cause the LP valve to transition (Continued)

to a closed position, cause the HP and/or bleed valve to transition to an open position, and determine that the HP conduit is not pressurized based on the information generated by the sensors.

19 Claims, 6 Drawing Sheets

Related U.S. Application Data on Mar. 9, 2015, provisional application No. 62/195,104, filed on Jul. 21, 2015.

(51) Int. Cl.
    *F17D 3/01*     (2006.01)
    *F17D 1/04*     (2006.01)
    *F17D 1/07*     (2006.01)
    *E21B 41/00*     (2006.01)
    *F16K 11/22*     (2006.01)

(52) U.S. Cl.
    CPC ............... *F17D 1/04* (2013.01); *F17D 1/07* (2013.01); *F17D 3/01* (2013.01); *F17C 2205/0146* (2013.01); *F17C 2205/0326* (2013.01); *F17C 2221/032* (2013.01); *F17C 2250/03* (2013.01); *F17C 2250/032* (2013.01); *F17C 2250/043* (2013.01); *F17C 2250/0443* (2013.01); *F17C 2265/068* (2013.01); *F17C 2270/0142* (2013.01)

(58) Field of Classification Search
    CPC ........ F17C 2250/043; F17C 2250/0443; F17C 2250/03; F17C 2250/032; F17C 2270/0142; F17C 2205/0146; F17C 2205/0326; F17C 2221/032; F17C 2265/068

USPC .............................. 137/487.5, 269
See application file for complete search history.

(56) References Cited

U.S. PATENT DOCUMENTS

| | | |
|---|---|---|
| 2007/0277982 A1 | 12/2007 | Shampine et al. |
| 2009/0120635 A1 | 5/2009 | Neal |
| 2009/0194273 A1 | 8/2009 | Surjaatmadja et al. |
| 2009/0222180 A1* | 9/2009 | Kraenzlein .......... F16K 37/0091 701/59 |
| 2011/0030963 A1 | 2/2011 | Demong et al. |
| 2011/0252895 A1* | 10/2011 | Kiesbauer ........... F16K 37/0091 73/862.583 |
| 2012/0235829 A1 | 9/2012 | Adnan et al. |
| 2013/0284455 A1 | 10/2013 | Kajaria et al. |
| 2014/0069651 A1 | 3/2014 | Shampine et al. |
| 2014/0090475 A1 | 4/2014 | Sherman et al. |
| 2014/0238498 A1* | 8/2014 | Ding .................... G05D 11/132 137/3 |
| 2014/0277772 A1 | 9/2014 | Lopez et al. |
| 2014/0290768 A1 | 10/2014 | Randle et al. |
| 2015/0149100 A1* | 5/2015 | Eisenbeis ............... G01B 7/003 702/58 |
| 2015/0153314 A1 | 6/2015 | Karoum et al. |
| 2016/0319648 A1 | 11/2016 | Hayworth et al. |
| 2017/0285668 A1* | 10/2017 | Moseley ................. E21B 43/26 |
| 2018/0095455 A1* | 4/2018 | Silva .................... E21B 47/0006 |
| 2018/0096277 A1* | 4/2018 | Maidla .................... E21B 41/00 |
| 2018/0112795 A1* | 4/2018 | Anderson .......... G05B 23/0237 |

OTHER PUBLICATIONS

International Search Report and Written Opinion issued in International Patent Appl. No. PCT/US2016/021336 dated Jun. 2, 2016; 18 pages.

* cited by examiner

US 11,041,579 B2

AUTOMATED OPERATION OF WELLSITE EQUIPMENT

CROSS-REFERENCE TO RELATED APPLICATIONS

This application claims priority to and the benefit of U.S. Provisional Application No. 62/130,045, titled "METHOD OF AUTOMATIC MANIFOLD VALVES SANITY TEST," filed Mar. 9, 2015, the entire disclosure of which is hereby incorporated herein by reference.

This application claims priority to and the benefit of U.S. Provisional Application No. 62/130,174, titled "AUTOMATED RELEASE OF TRAPPED PRESSURE AND FLUID FROM HIGH PRESSURE PUMP LINES," filed Mar. 9, 2015, the entire disclosure of which is hereby incorporated herein by reference.

This application also claims priority to and the benefit of U.S. Provisional Application No. 62/195,104, titled "REMOTE MANIFOLD VALVE AND PUMP PAIRING TECHNIQUE FOR A MULTI-PUMP SYSTEM," filed Jul. 21, 2015, the entire disclosure of which is hereby incorporated herein by reference.

BACKGROUND OF THE DISCLOSURE

High-volume, high-pressure pumps are utilized at wellsites for a variety of pumping operations. Such operations may include drilling, cementing, acidizing, water jet cutting, hydraulic fracturing, and other wellsite operations. In some pumping operations, several pumps may be fluidly connected to a well via various fluid conduits and at least one manifold. During such operations, the manifold distributes low-pressure fluid from mixer, blender, and/or other units among the pumps and combines pressurized fluid from the pumps for injection into the well. The manifold may have a large physical size and weight to satisfy intended fluid flow rates and operating pressures generated by the pumps. For example, the manifold may convey fluid at a pressure exceeding about 15,000 pounds per square inch (PSI) and a fluid flow rate exceeding about 1,500 gallons per minute (GPM).

The success of the oilfield operations may be related to many factors, including operational efficiency, failure rates, and safety of the pumps and the manifold at the wellsite. High fluid pressures, flow rates, and vibrations generated by the pumps may cause mechanical fatigue, wear, and other damage to the pumps and various downstream components, including the manifold and various associated fluid sensors, valves, couplings, and conduits. Such mechanical fatigue and wear cause leaks and/or other failures in the pumps and the downstream components. To ensure that the fluid sensors and valves are not stuck, worn out, or otherwise damaged, human operators at the wellsite approach the manifold during pumping operations to visually and/or manually inspect the fluid sensors and valves, thus exposing themselves to a potentially dangerous environment.

The operators also manually disconnect the pumps from the manifold, such as after completion of a job, when switching to a different well on a multi-well site, or when changing a pump due to mechanical problems. The task of fluidly disconnecting the pump from the manifold can be dangerous, because high-pressure fluid trapped within the pump and/or the connected conduits may escape, which can lead to serious injuries. The pump and/or the conduits may also contain leftover fluid, which may spill onto the ground when the fluid conduits are disconnected from the pump and/or the manifold, potentially having an adverse environmental impact.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a manifold unit and a controller. The manifold unit includes ports and valves. Each valve is operable to control flow through a corresponding one of the ports. The controller is operable to, with respect to each of the valves: remotely control the valve by transmitting a command signal to the valve to transition the valve from an existing setting to an intended setting; after transmitting the command signal, receive a feedback signal from the valve indicative of an actual setting of the valve; and assess an operational health of the valve based on the intended and actual settings.

The present disclosure also introduces a method that includes establishing communication between a controller and each of the valves of a manifold unit. Each valve is operable to control flow through a corresponding port of the manifold unit. The method also includes operating the controller to, with respect to each of the valves: remotely control the valve by transmitting a command signal to the valve to transition the valve from an existing setting to an intended setting; after transmitting the command signal, receive a feedback signal from the valve indicative of an actual setting of the valve; and assess an operational health of the valve based on the intended and actual settings.

The present disclosure also introduces an apparatus that includes a manifold unit. The manifold unit includes a low-pressure (LP) manifold having LP ports, LP valves each operable to control flow through a corresponding one of the LP ports, a high-pressure (HP) manifold having HP ports, HP valves each operable to control flow through a corresponding one of the HP ports, bleed ports each fluidly coupled with a corresponding one of the HP ports, and bleed valves each fluidly coupled with and remotely operable to control flow through a corresponding one of the bleed ports from the corresponding HP port. The apparatus also includes pumps, LP conduits each fluidly coupling a corresponding one of the pumps and a corresponding one of the LP ports, HP conduits each fluidly coupling a corresponding one of the pumps and a corresponding one of the HP ports, and sensors each operable to generate information indicative of fluid pressure within a corresponding one of the HP conduits. The apparatus also includes a controller in communication with the LP valves, the HP valves, the bleed valves, the sensors, and the pumps. The controller is operable to, with respect to each of the pumps: cause the LP valve corresponding to the pump to transition to a closed flow position; cause one of the HP valve corresponding to the pump and the bleed valve corresponding to the pump to transition to an open flow position; and determine whether the HP conduit corresponding to the pump is pressurized based on the information generated by the corresponding one of the sensors.

The present disclosure also introduces a method performed in conjunction with a number of pumps and a manifold unit. The manifold unit includes an LP manifold having LP ports, LP valves each operable to control flow through a corresponding one of the LP ports, an HP manifold having HP ports, HP valves each operable to control flow through a corresponding one of the HP ports, bleed ports each fluidly coupled with a corresponding one of the HP ports, and bleed valves each fluidly coupled with and remotely operable to control flow through a corresponding one of the bleed ports from the corresponding HP port. The method includes fluidly coupling each of the pumps with the LP manifold via LP conduits each fluidly coupling a corresponding one of the pumps with a corresponding one of the LP ports, fluidly coupling each of the pumps with the HP manifold via HP conduits each fluidly coupling a corresponding one of the pumps with a corresponding one of the HP ports, and establishing communication between a controller and each of the LP valves, the HP valves, the bleed valves, the pumps, and a number of sensors. Each sensor is operable to generate information indicative of fluid pressure within a corresponding one of the HP conduits. The method also includes operating the controller to, with respect to each of the pumps, cause the pump to operate and then: cause the LP valve corresponding to the pump to transition to a closed flow position; and cause one of the HP valve corresponding to the pump and the bleed valve corresponding to the pump to transition to an open flow position. The method also includes operating the controller to, with respect to each of the pumps, determine that the HP conduit corresponding to the pump is not pressurized based on the information generated by the corresponding one of the sensors.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
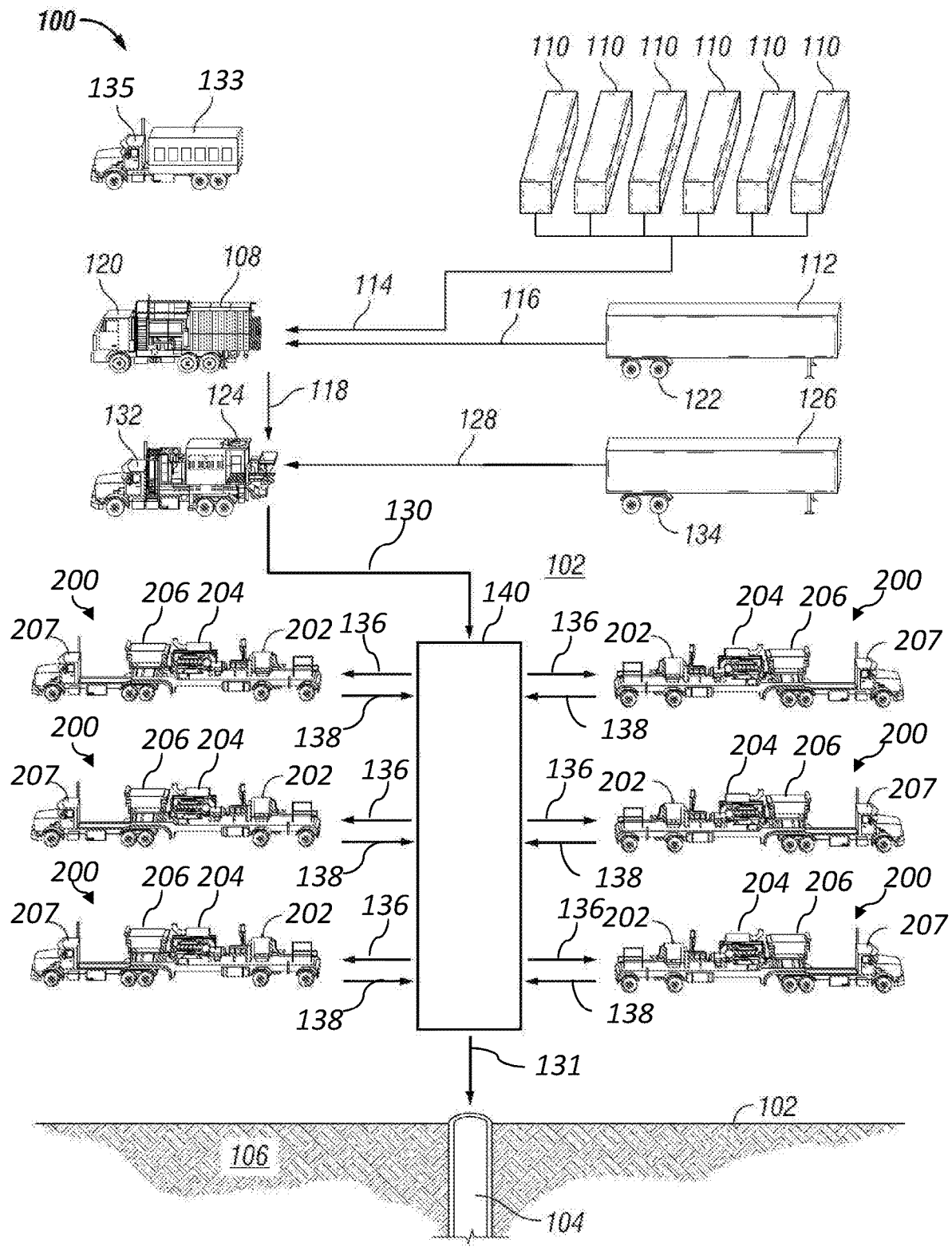
FIG. 1 is a schematic view of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example wellsite system 100 according to one or more aspects of the present disclosure. The figure depicts a wellsite surface 102 adjacent to a wellbore 104 and a partial sectional view of the subterranean formation 106 penetrated by the wellbore 104 below the wellsite surface 102. The wellsite system 100 may comprise a first mixer 108 fluidly connected with one or more tanks 110 and a first container 112. The first container 112 may contain a first material and the tanks 110 may contain a liquid. The first material may be or comprise a hydratable material or gelling agent, such as guar, polymers, synthetic polymers, galactomannan, polysaccharides, cellulose, and/or clay, among other examples, and the liquid may be or comprise an aqueous fluid, which may comprise water or an aqueous solution comprising water, among other examples. The first mixer 108 may be operable to receive the first material and the liquid via two or more fluid conduits 114, 116, and mix or otherwise combine the first material and the liquid to form a base fluid, which may be or comprise that which is known in the art as a gel. The first mixer 108 may then discharge the base fluid via one or more fluid conduits 118.

The first mixer 108 and the first container 112 may each be disposed on corresponding trucks, trailers, and/or other mobile carriers 120, 122, respectively, such as may permit their transportation to the wellsite surface 102. However, the first mixer 108 and/or first container 112 may be skidded or otherwise stationary, and/or may be temporarily or permanently installed at the wellsite surface 102.

The wellsite system 100 may further comprise a second mixer 124 fluidly connected with the first mixer 108 and a second container 126. The second container 126 may contain a second material that may be substantially different than the first material. For example, the second material may be or comprise a proppant material, such as sand, sand-like particles, silica, quartz, and/or propping agents, among other examples. The second mixer 124 may be operable to receive the base fluid from the first mixer 108 via one or more fluid conduits 118, and the second material from the second container 126 via one or more fluid conduits 128, and mix or otherwise combine the base fluid and the second material to form a mixture, which may be or comprise that which is known in the art as a fracturing fluid. The second mixer 124 may then discharge the mixture via one or more fluid conduits 130. For clarity, the mixture discharged from the second mixer 124 via the one or more fluid conduits 130 will be referred to hereinafter simply as "a fluid."

The second mixer 124 and the second container 126 may each be disposed on corresponding trucks, trailers, and/or other mobile carriers 132, 134, respectively, such as may permit their transportation to the wellsite surface 102. However, the second mixer 124 and/or second container 126 may be skidded or otherwise stationary, and/or may be temporarily or permanently installed at the wellsite surface 102.

The fluid may be communicated from the second mixer 124 via the one or more fluid conduits 130 to a manifold unit 140, which may be or comprise what known in the art as a manifold trailer or missile. The manifold unit 140 may be operable to distribute the fluid among a plurality of pump units 200. The manifold unit 140 comprises a low-pressure (LP) portion having a plurality of LP inlet ports and LP outlet ports (shown in FIG. 2). The LP inlet ports are operable to receive the fluid via the one or more fluid conduits 130, and the LP outlet ports are operable to discharge the fluid to the pump units 200 via a corresponding one or more LP fluid conduits 136. The manifold unit 140 also comprises a high-pressure (HP) portion having HP inlet ports and HP outlet ports (shown in FIG. 2). The HP inlet ports are operable to receive the pressurized fluid from the pump units 200 via a corresponding one or more HP fluid conduits 138 and the HP outlet ports are operable to discharge the pressurized fluid. The fluid may then be injected into the wellbore 104, via one or more fluid conduits 131, perhaps through various additional conduits, valves, and/or other hydraulic circuitry fluidly connected between the manifold unit 140 and the wellbore 104.

The manifold unit 140 may be mounted on one or more trucks, trailers, and/or other mobile carriers (not shown), such as may permit its transportation to the wellsite surface 102. However, the manifold unit 140 may be skidded or otherwise stationary, and/or may be temporarily or permanently installed at the wellsite surface 102.

Each of the pump units 200 may comprise a pump 202, a prime mover 204, and a heat exchanger 206. The pumps 202 may be implemented as reciprocating pumps, each comprising fluid pressurizing chambers (shown in FIG. 4) and fluid displacing members (shown in FIG. 4). Depending on the size of each pump 202 and the operating speed of the corresponding prime mover 204, each pump 202 may be operable to transfer or otherwise move the fluid into the HP portion of the manifold unit 140 at a flow rate ranging between about 100 GPM and about 1,500 GPM.

The pump units 200 may each be mounted on corresponding trucks, trailers, and/or other mobile carriers 207, such as may permit their transportation to the wellsite surface 102. However, the pump units 200 may be skidded or otherwise stationary, and/or may be temporarily or permanently installed at the wellsite surface 102. Although the pump fleet of the wellsite system 100 is shown comprising six pump units 200, each disposed on the corresponding mobile carrier 207, a pump fleet comprising other quantities of pump units 200 is also within the scope of the present disclosure.

The wellsite system 100 may also comprise a control/power center 133, such as may be operable to provide control and/or centralized electric power distribution to one or more portions of the wellsite system 100. The control/power center 133 may be operable to monitor and control at least a portion of the wellsite system 100 during pumping operations. For example, the control/power center 133 may be operable to monitor and control one or more portions of the first mixer 108, the second mixer 124, the pump units 200, and other pumps and/or conveyers (not shown), such as may be operable to move the fluids, materials, and/or mixtures described above. The control/power center 133 may also be operable to monitor and control operations of the manifold unit 140 prior to and during the pumping operations. The control/power center 133 may comprise an engine-generator set, such as a gas turbine generator, an internal combustion engine generator, and/or other sources of electric power. Electric power and/or control signals may be communicated between the control/power center 133 and other wellsite equipment via electric conductors (not shown). However, other means of signal communication, such as wireless communication, are also within the scope of the present disclosure.

The control/power center 133 may be disposed on a corresponding truck, trailer, and/or other mobile carrier 135, such as may permit its transportation to the wellsite surface 102. However, the control/power center 133 may be skidded or otherwise stationary, and/or may be temporarily or permanently installed at the wellsite surface 102.

FIG. 1 depicts the wellsite system 100 as being operable to form fluids and/or mixtures that may be pressurized and individually or collectively injected into the wellbore 104 during hydraulic fracturing of the subterranean formation 106. However, it is to be understood that the wellsite system 100 may be operable to mix and/or produce other mixtures and/or fluids that may be pressurized by the pump units 200 and individually or collectively injected into the wellbore 104 during other oilfield operations, such as drilling, cementing, acidizing, chemical injecting, and/or water jet cutting operations, among other examples.

Figure 2:
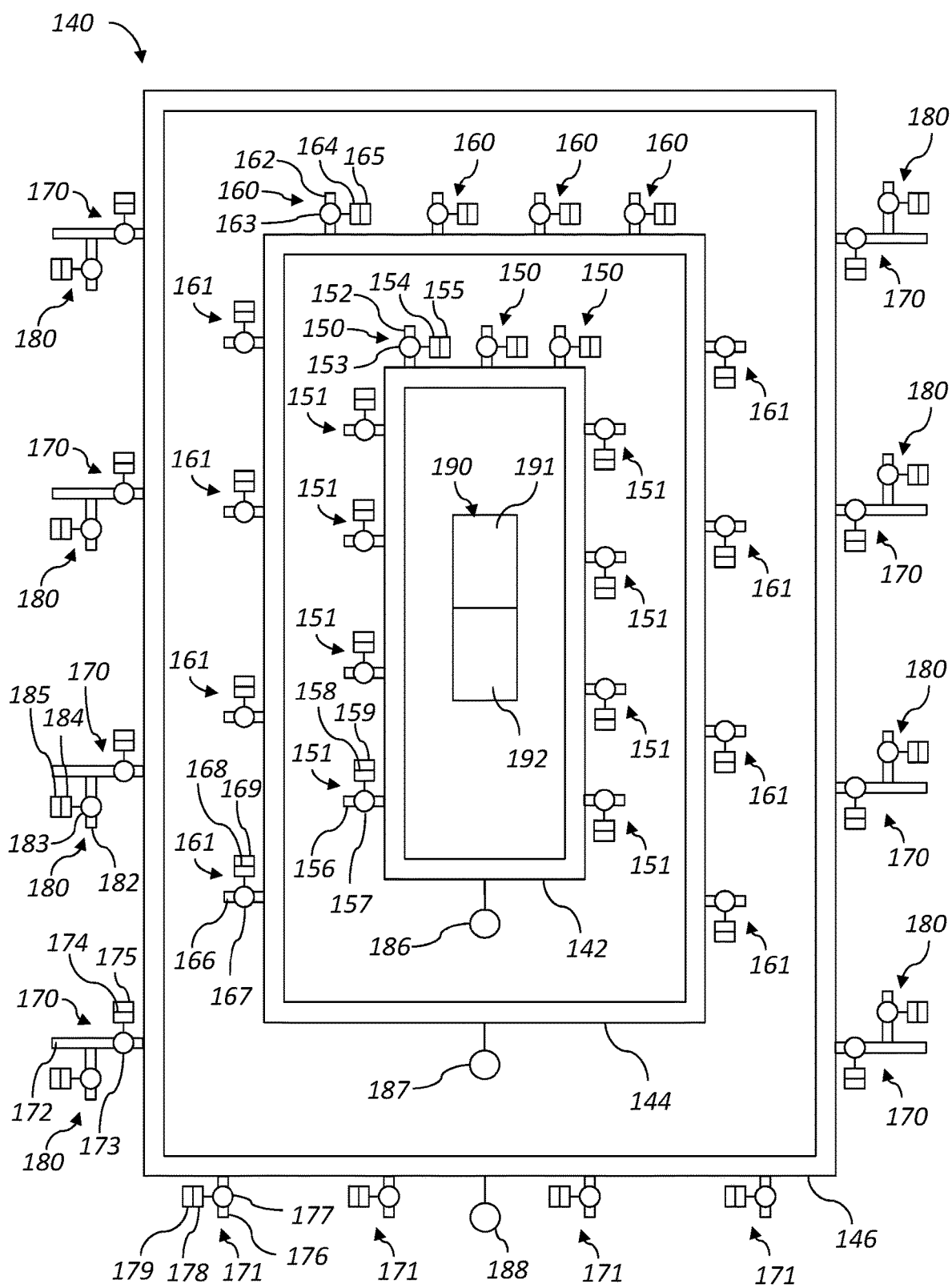
FIG. 2 is a schematic view of a portion of an example implementation of the apparatus shown in FIG. 1 according to one or more aspects of the present disclosure.

FIG. 2 is a schematic view of at least a portion of an example implementation of the manifold unit 140 shown in FIG. 1 according to one or more aspects of the present disclosure. The manifold unit 140 may be utilized in various implementations of a wellsite system. However, for the sake of clarity and ease of understanding, the manifold unit 140 is described below in the context of the wellsite system 100 shown in FIG. 1. Thus, the following description refers to FIGS. 1 and 2, collectively.

The manifold unit 140 may be or comprise a manifold system operable to distribute LP fluid received from the mixers 108, 124 among the pump units 200 and combine the HP fluid received from the pump units 200 for injection into the wellbore 104. The manifold unit 140 comprises one or more LP manifolds 142, 144 that receive the LP fluid from the mixers 108, 124 via the fluid conduit 130 and distribute the fluid among the pumps 202. The manifold unit 140 also comprises one or more HP manifolds 146 that receive and combine the HP fluid from the pumps 202 and discharge the fluid for injection into the wellbore 104 via the fluid conduit 131.

The manifold unit 140 also comprises a plurality of fluid valves (described below via reference numbers 153, 157, 163, 167, 173, 177, and 183) operable to control fluid flow into and/or out of the LP and HP manifolds 142, 144, 146. The fluid valves may comprise ball valves, globe valves, butterfly valves, and/or other types of valves operable to shut off fluid flow or otherwise control fluid flow into and/or out of the LP and HP manifolds 142, 144, 146. Each fluid valve may be actuated remotely by an actuator, including an electric actuator, such as a solenoid or motor, or a fluid actuator, such as a pneumatic or hydraulic cylinder or rotary actuator. The fluid valves may also be manually actuated by the human operators.

Each fluid valve may also include a corresponding feedback sensor operable to generate a signal or information indicative of an actual position or setting of that fluid valve, such as to monitor in-real time the actual setting of that fluid valve. The actual setting of each fluid valve may include an open-flow setting, a closed-flow setting, and an intermediate or transitional setting between the open-flow and closed-flow settings. Each feedback sensor may be disposed in association with the corresponding fluid valve in a manner permitting sensing of the actual setting of that fluid valve.

For example, each feedback sensor may monitor position or orientation of a fluid-blocking portion of the fluid valve, such as a ball or flapper, or another moving portion of the fluid valve, such as a rotating shaft or stem. Each feedback sensor may be coupled with or disposed adjacent the corresponding fluid valve, or each feedback sensor may be incorporated as part of the corresponding fluid valve. The feedback sensors may include proximity sensors, such as capacitive sensors, inductive sensors, magnetic sensors, Hall effect sensors, and/or reed switches, among other examples. The feedback sensors may also or instead include linear position sensors, such as linear potentiometers. The feedback sensors may also or instead include rotary position sensors, such as encoders, rotary potentiometers, synchros, resolvers, and/or rotary variable differential transformers (RVDT), among other examples.

The manifold unit 140 may comprise a first LP portion or manifold 142 implemented as a fluid conduit arranged in a closed loop configuration. The first LP manifold 142 may comprise a plurality of LP inlet valve assemblies 150, each comprising an LP fluid inlet port 152 operable to fluidly connect with the one or more fluid conduits 130 to receive the fluid from the second mixer 124. The first LP manifold 142 may also comprise a plurality of LP outlet valve assemblies 151 disposed on opposing sides of the first LP manifold 142, each comprising an LP fluid outlet port 156 operable to fluidly connect the first LP manifold 142 with the pumps 202 via corresponding LP fluid conduits 136. Each LP inlet valve assembly 150 may further include an LP fluid valve 153 disposed at a corresponding LP fluid inlet port 152 for selectively opening and closing the corresponding LP fluid inlet port 152, such as may selectively permit or otherwise control fluid flow into the first LP manifold 142. Similarly, each LP outlet valve assembly 151 may include an LP fluid valve 157 disposed at a corresponding LP fluid outlet port 156 for selectively opening and closing the corresponding LP fluid outlet port 156, such as may selectively permit fluid flow out of the first LP manifold 142. Each LP fluid valve 153, 157 may be selectively shifted or transitioned between open flow and closed flow settings by a corresponding actuator 154, 158, respectively, disposed in association with each LP fluid valve 153, 157. The actual setting of each LP fluid valve 153, 157 may be monitored or otherwise determined in real-time by feedback sensors 155, 159, respectively, disposed in association with the LP fluid valves 153, 157. For clarity, just one of the LP ports 152, 156, the LP fluid valves 153, 157, the actuators 154, 158, and the feedback sensors 155, 159 of the LP inlet and outlet valve assemblies 150, 151, respectively, are identified with numerals in FIG. 2. Although the first LP manifold 142 is shown comprising three LP inlet valve assemblies 150 and eight LP outlet valve assemblies 151, it is to be understood that the first LP manifold 142 may include other quantities of LP inlet and outlet valve assemblies 150, 151.

The manifold unit 140 may further comprise a second LP portion or manifold 144 implemented as a fluid conduit arranged in a closed loop configuration. The second LP manifold 144 may comprise a plurality of LP inlet valve assemblies 160, each comprising an LP fluid inlet port 162 operable to fluidly connect with the one or more fluid conduits 130 to receive the fluid from the second mixer 124. The second LP manifold 144 may also comprise a plurality of LP outlet valve assemblies 161 disposed on opposing sides of the second LP manifold 144, each comprising an LP fluid outlet port 166 operable to fluidly connect the second LP manifold 144 with the pumps 202 via corresponding LP fluid conduits 136. Each LP inlet valve assembly 160 may further include an LP fluid valve 163 disposed at a corresponding LP fluid inlet port 162 for selectively opening and closing the corresponding LP fluid inlet port 162, such as may selectively permit or otherwise control fluid flow into the second LP manifold 144. Similarly, each LP outlet valve assembly 161 may include an LP fluid valve 167 disposed at a corresponding LP fluid outlet port 166 for selectively opening and closing the corresponding LP fluid outlet port 166, such as may selectively permit fluid flow out of the second LP manifold 144. Each LP fluid valve 163, 167 may be selectively transitioned between open flow and closed flow settings by a corresponding actuator 164, 168, respectively, disposed in association with each LP fluid valve 163, 167. The actual setting of each LP fluid valve 163, 167 may be determined in real-time by feedback sensors 165, 169, respectively, disposed in association with each LP fluid valve 163, 167. For clarity, just one of the LP ports 162, 166, the LP fluid valves 163, 167, the actuators 164, 168, and the feedback sensors 165, 169 of the LP inlet and outlet valve assemblies 160, 161, respectively, are identified with numerals in FIG. 2. Although the second LP manifold 144 is shown comprising four LP inlet valve assemblies 160 and eight LP outlet valve assemblies 161, it is to be understood that the second LP manifold 144 may include other quantities of LP inlet and outlet valve assemblies 160, 161.

The manifold unit 140 may also comprise an HP portion or manifold 146 implemented as a fluid conduit arranged in a closed loop configuration. The HP manifold 146 may comprise a plurality of HP inlet valve assemblies 170 disposed on opposing sides of the HP manifold 146, each comprising an HP fluid inlet port 172 operable to fluidly connect the pumps 202 with the HP manifold 146 via corresponding HP fluid conduits 138. The HP manifold 146 may also comprise a plurality of HP outlet valve assemblies 171, each comprising an HP outlet port 176 operable to fluidly connect with the one or more fluid conduits 131 to inject the fluid into the wellbore 104. Each HP inlet valve assembly 170 may further include an HP fluid valve 173 disposed at a corresponding HP fluid inlet port 172 for selectively opening and closing the corresponding HP fluid inlet port 172, such as may selectively permit or otherwise control fluid flow into the HP manifold 146. Similarly, each HP outlet valve assembly 171 may include an HP fluid valve 177 disposed at a corresponding HP fluid outlet port 176 for selectively opening and closing the corresponding HP fluid outlet port 176, such as may selectively permit fluid flow out of the HP manifold 146. Each HP fluid valve 173, 177 may be selectively transitioned between open flow and closed flow settings by a corresponding actuator 174, 178, respectively, disposed in association with each HP fluid valve 173, 177. The actual setting of each HP fluid valve 173, 177 may be determined in real-time by feedback sensors 175, 179, respectively, associated with the HP fluid valves 173, 177. For clarity, just one of the HP ports 172, 176, the HP fluid valves 173, 177, the actuators 174, 178, and the feedback sensors 175, 179 of the HP inlet and outlet valve assemblies 170, 171, respectively, are identified with numerals in FIG. 2. Although the HP manifold 146 is shown comprising eight HP inlet valve assemblies 170 and four HP outlet valve assemblies 171, it is to be understood that the HP manifold 146 may include other quantities of HP inlet and outlet valve assemblies 170, 171.

Each HP fluid inlet port 172 of the HP manifold 146 may be fluidly connected with a corresponding bleed valve assembly 180 operable to release fluid and pressure from the HP fluid inlet port 172 and, perhaps, portions of the pump unit 200 in fluid communication with the corresponding HP fluid conduit 138. If a corresponding HP fluid valve 173 is open, the bleed valve assembly 180 may also bleed fluid and pressure from the HP manifold 146. Each bleed valve assembly 180 may comprise a bleed port 182 and a corresponding fluid bleed valve 183 disposed at the bleed port 182 for selectively opening and closing the bleed port 182, such as to selectively permit or otherwise control fluid flow out of a corresponding HP fluid inlet port 172. Each fluid bleed valve 183 may be selectively transitioned between open flow and closed flow settings by a corresponding actuator 184 disposed in association with each fluid bleed valve 183. The actual setting of each fluid bleed valve 183 may be determined in real-time by a corresponding feedback sensor 185 associated with each fluid bleed valve 183. The fluid bled or released by the bleed valve assemblies 180 via corresponding bleed ports 182 may be communicated to a fluid container (not shown). The fluid container may be or comprise an external fluid container, such as a fluid pit or another container that may be constructed on or transported to the wellsite surface 102, in which case the bleed ports 182 may be fluidly connected with the fluid container. The fluid container may also be or comprise the first and/or second LP manifolds 142, 144, in which case the bleed ports 182 may be fluidly connected with the LP fluid inlet ports 152, 162. For clarity, just one of the bleed ports 182, the fluid bleed valves 183, the actuators 184, and the feedback sensors 185 of the bleed valve assemblies 180 are identified with numerals in FIG. 2.

Although shown in FIG. 2 as single continuous members, one or more of the manifolds 142, 144, 146 may comprise a plurality of fluid conduits or other fluid conveying members connected together to collectively form the manifold unit 140. The plurality of the fluid conduits may be fixedly connected together via threaded means, fasteners, bolts, flanges, welding, and/or other connection means. Furthermore, although shown as comprising a closed loop configuration, one or more of the manifolds 142, 144, 146 may comprise otherwise shaped open or closed loop or configurations, including a U-shaped configuration, a T-shaped configuration, an I-shaped configuration, or other configurations operable to communicate the fluid from the LP and HP fluid inlet ports 152, 162, 172 to the LP and HP fluid outlet ports 156, 166, 176. Although FIG. 2 depicts the manifolds 142, 144, 146 as being progressively larger, it is to be understood that FIG. 2 is a schematic representation and that the manifolds 142, 144, 146 may be the same size or may have other relative dimensions.

A fluid power unit 190 may provide pressurized fluid to operate the actuators 154, 158, 164, 168, 174, 178, 184. For example the fluid power unit 190 may comprise an air and/or compressor in implementations in which the actuators 154, 158, 164, 168, 174, 178, 184 are operable by pressurized air and/or other gas. However, the fluid power unit 190 may comprise a hydraulic power pack in implementations in which the actuators 154, 158, 164, 168, 174, 178, 184 are operable by pressurized hydraulic fluid. The fluid power unit 190 may comprise a fluid storage container 191, such as an air tank or a hydraulic fluid tank, and a prime mover 192, such as an electric motor, a hydraulic motor, or an engine for pressurizing the fluid. Fluid interconnections between the fluid power unit 190 and the actuators 154, 158, 164, 168, 174, 178, 184 may be via various piping, hoses, and/or other fluid conduits. However, for the sake of clarity and ease of understanding, such interconnections are not depicted in FIG. 2, as a person having ordinary skill in the art will readily recognize how such interconnections may be implemented within the scope of the present disclosure without further illustration in FIG. 2.

The manifold unit 140 may also comprise pressure sensors 186, 187, 188 fluidly connected with the manifold unit 140. The pressure sensors 186, 187, 188 may be operable to generate signals or information indicative of the fluid pressure within the LP and HP manifolds 142, 144, 146, respectively.

Figure 3:
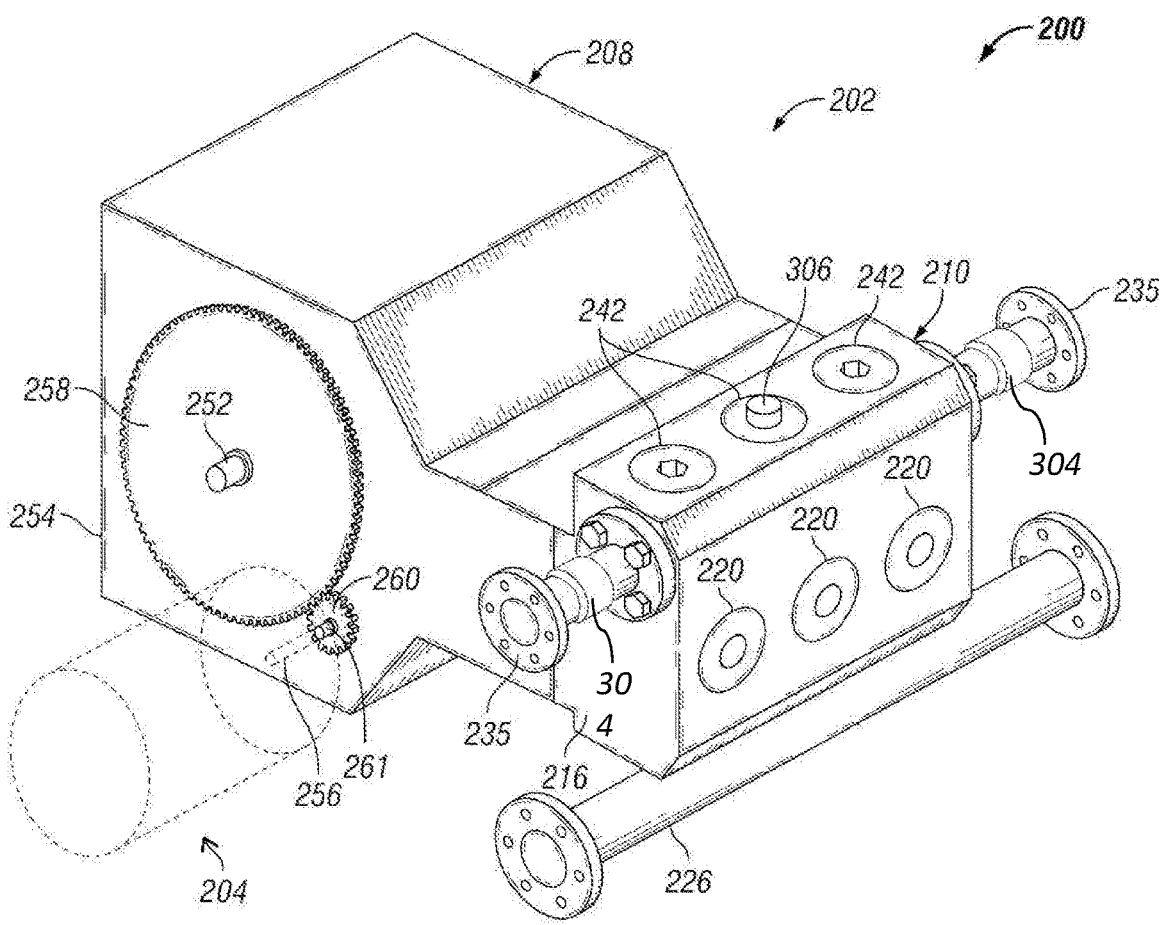
FIG. 3 is a perspective view of a portion of an example implementation of the apparatus shown in FIG. 1 according to one or more aspects of the present disclosure.
Figure 4:
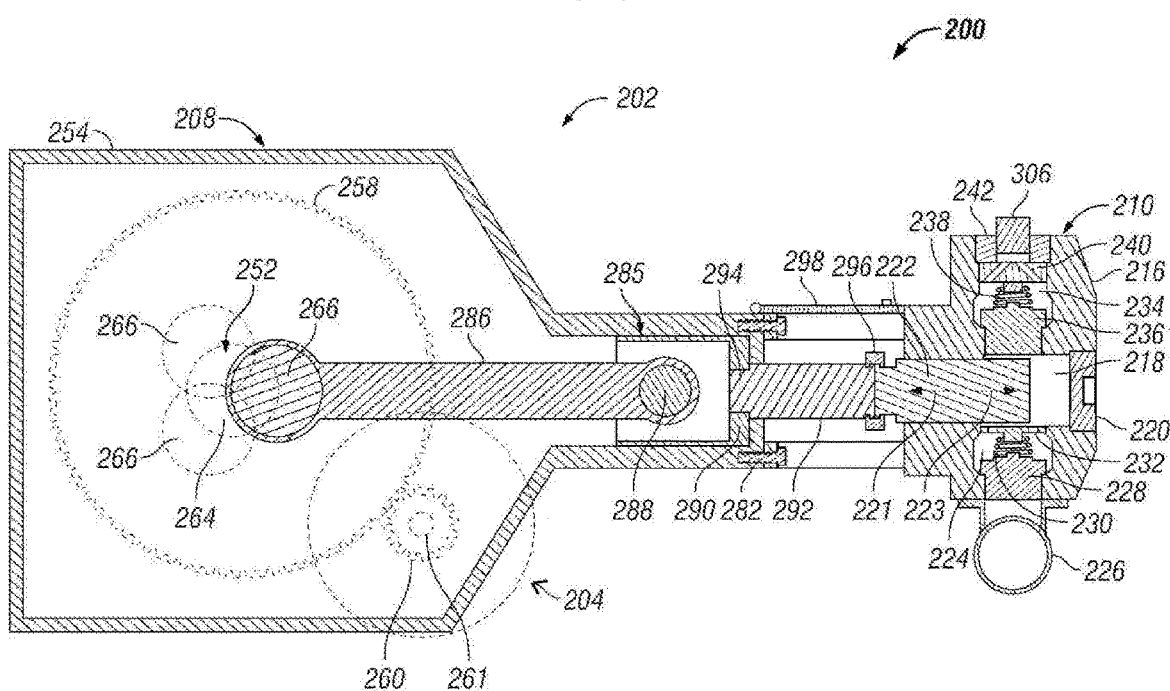
FIG. 4 is a sectional view of the apparatus shown in FIG. 3 according to one or more aspects of the present disclosure.

FIG. 3 is a perspective view of a portion of an example implementation of one pump unit 200 shown in FIG. 1 according to one or more aspects of the present disclosure. FIG. 4 is a side sectional view of a portion of the pump unit 200 shown in FIG. 3. The following description refers to FIGS. 1-4, collectively.

As described above, the pump unit 200 comprises the pump 202 operatively coupled with and actuated by the prime mover 204. The pump 202 comprises a power section 208 and a fluid section 210. The fluid section 210 may comprise a pump housing 216 having a plurality of fluid chambers 218. One end of each fluid chamber 218 may be plugged by a cover plate 220, such as may be threadedly engaged with the pump housing 216 while the opposite end of each fluid chamber 218 may contain a reciprocating member 222 slidably disposed therein and operable to displace the fluid within the corresponding fluid chamber 218. Although the reciprocating member 222 is depicted as a plunger, the reciprocating member 222 may also be implemented as a piston, diaphragm, or another reciprocating fluid displacing member.

Each fluid chamber 218 is fluidly connected with a corresponding one of a plurality of fluid inlet cavities 224 each adapted for communicating fluid from an LP fluid inlet conduit 226 into a corresponding fluid chamber 218. The LP fluid inlet conduit 226 may be in fluid communication with a corresponding LP fluid outlet port 156, 166 of the manifold 140 via the one or more LP fluid conduits 136. Each fluid inlet cavity 224 contains an inlet valve 228 operable to control fluid flow from the LP fluid inlet conduit 226 into the fluid chamber 218. Each inlet valve 228 may be biased toward a closed flow setting by a first spring or another biasing member 230, which may be held in place by an inlet valve stop 232. Each inlet valve 228 may be actuated to an open flow setting by a selected or predetermined differential pressure between the corresponding fluid inlet cavity 224 and the LP fluid inlet conduit 226.

Each fluid chamber 218 is also fluidly connected with a fluid outlet cavity 234 extending through the pump housing 216 transverse to the reciprocating members 222. The fluid outlet cavity 234 is adapted for communicating pressurized fluid from each fluid chamber 218 into one or more HP fluid outlet conduits 235 fluidly connected at one or both ends of the fluid outlet cavity 234. The HP fluid outlet conduits 235 may be in fluid communication with a corresponding HP fluid inlet port 172 of the manifold 140 via the one or more HP fluid conduits 138. The fluid section 210 also contains a plurality of outlet valves 236 each operable to control fluid flow from a corresponding fluid chamber 218 into the fluid outlet cavity 234. Each outlet valve 236 may be biased toward a closed flow setting by a spring or another biasing member 238, which may be held in place by an outlet valve stop 240. Each outlet valve 236 may be actuated to an open flow setting by a selected or predetermined differential pressure between the corresponding fluid chamber 218 and the fluid outlet cavity 234. The fluid outlet cavity 234 may be plugged by cover plates 242, such as may be threadedly engaged with the pump housing 216.

During pumping operations, portions of the power section 208 of the pump unit 200 rotate in a manner that generates a reciprocating linear motion to move the reciprocating members 222 longitudinally within the corresponding fluid chambers 218, thereby alternatingly drawing and displacing the fluid within the fluid chambers 218. With regard to each reciprocating member 222, as the reciprocating member 222 moves out of the fluid chamber 218, as indicated by arrow 221, the pressure of the fluid inside the corresponding fluid chamber 218 decreases, thus creating a differential pressure across the corresponding fluid inlet valve 228. The pressure differential operates to compress the biasing member 230, thus actuating the fluid inlet valve 228 to an open flow setting to permit the fluid from the LP fluid inlet conduit 226 to enter the corresponding fluid inlet cavity 224. The fluid then enters the fluid chamber 218 as the reciprocating member 222 continues to move longitudinally out of the fluid chamber 218 until the pressure difference between the fluid inside the fluid chamber 218 and the fluid within the LP fluid inlet conduit 226 is low enough to permit the biasing member 230 to actuate the fluid inlet valve 228 to the closed flow setting. As the reciprocating member 222 begins to move longitudinally back into the fluid chamber 218, as indicated by arrow 223, the pressure of the fluid inside of fluid chamber 218 begins to increase. The fluid pressure inside the fluid chamber 218 continues to increase as the reciprocating member 222 continues to move into the fluid chamber 218 until the pressure of the fluid inside the fluid chamber 218 is high enough to overcome the pressure of the fluid inside the fluid outlet cavity 234 and compress the biasing member 238, thus actuating the fluid outlet valve 236 to the open flow setting and permitting the pressurized fluid to move into the fluid outlet cavity 234 and the HP fluid outlet conduit 235. Thereafter, the fluid may be communicated to the manifold 140 via the one or more HP fluid conduits 138 and the wellbore 104 via the one or more fluid conduits 131.

The fluid flow rate generated by the pump unit 200 may depend on the physical size of the reciprocating members 222 and fluid chambers 218, as well as the pump operating speed, which may be defined by the speed or rate at which the reciprocating members 222 cycle or move within the fluid chambers 218. The speed or rate at which the reciprocating members 222 move may be related to the rotational speed of the power section 208 and/or the prime mover 204. Accordingly, the fluid flow rate may be controlled by controlling the rotational speed of the power section 208 and/or the prime mover.

The prime mover 204 may be operatively coupled with a drive shaft 252 of the power section 208. The drive shaft 252 may be enclosed and maintained in position by a power section housing 254, such that the prime mover 204 is operable to drive or otherwise rotate the drive shaft 252. The prime mover 204 may comprise a rotatable output shaft 256 operatively connected with the drive shaft 252 by a transmission or gear train, which may comprise at least one spur gear 258 coupled with the drive shaft 252 and at least one pinion gear 260 coupled with a support shaft 261. The output shaft 256 and the support shaft 261 may be coupled, such as may facilitate transfer of torque from the prime mover 204 to the support shaft 261, the pinion gear 260, the spur gear 258, and the drive shaft 252. For clarity, FIGS. 3 and 4 show the transmission comprising a single spur gear 258 engaging a single pinion gear 260, however, it is to be understood that the transmission may comprise two or more sets of gears, such as may permit the transmission to be shifted between different gear configurations to control the operating speed of the drive shaft 252 and, thus, the pumping rate of the fluid section 210. To prevent relative rotation between the power section housing 254 and the prime mover 204, the power section housing 254 and prime mover 204 may be fixedly coupled together or to a common base, such as a trailer of the mobile carrier 148. The prime mover 204 may comprise an engine, such as a gasoline engine or a diesel engine, an electric motor, such as a synchronous or asynchronous electric motor, including a synchronous permanent magnet motor, a hydraulic motor, or another prime mover operable to rotate the drive shaft 252.

The drive shaft 252 may be implemented as a crankshaft comprising a plurality of axial journals 264 and offset journals 266. The axial journals 264 may extend along a central axis of rotation of the drive shaft 252, while the offset journals 266 may be offset from the central axis of rotation by a selected or predetermined distance and spaced 120 degrees apart with respect to the axial journals 264. The drive shaft 252 may be supported in position within the power section 208 by the power section housing 254, wherein two of the axial journals 264 may extend through opposing openings in the power section housing 254.

The power section 208 and the fluid section 210 may be coupled or otherwise connected together. For example, the pump housing 216 may be fastened with the power section housing 254 by a plurality of threaded fasteners 282. The pump 202 may further comprise an access door 298, which may facilitate access to portions of the pump 202 located between the power section 208 and the fluid section 210, such as during assembly and/or maintenance of the pump 202.

To transform and transmit the rotational motion of the drive shaft 252 to a reciprocating linear motion of the reciprocating members 222, a plurality of crosshead mechanisms 285 may be utilized. For example, each crosshead mechanism 285 may comprise a connecting rod 286 pivotally coupled with a corresponding offset journal 266 at one end and with a pin 288 of a crosshead 290 at an opposing end. During pumping operations, walls and/or interior portions of the power section housing 254 may guide each crosshead 290, such as may reduce or eliminate lateral motion of each crosshead 290. Each crosshead mechanism 285 may further comprise a piston rod 292 coupling the crosshead 290 with the reciprocating member 222. The piston rod 292 may be coupled with the crosshead 290 via a threaded connection 294 and with the reciprocating member 222 via a flexible connection 296.

Although FIGS. 3 and 4 show the pump unit 200 comprising a triplex reciprocating pump 202, which has three fluid chambers 218 and three reciprocating members 222, implementations within the scope of the present disclosure may include the pump 202 as or comprising a quintuplex reciprocating pump having five fluid chambers 218 and five reciprocating members 222, or a pump having other quantities of fluid chambers 218 and reciprocating members 222. It is further noted that the pump 202 described above and shown in FIGS. 3 and 4 is merely an example, and that other pumps, such as diaphragm pumps, gear pumps, external circumferential pumps, internal circumferential pumps, lobe pumps, and other positive displacement pumps, are also within the scope of the present disclosure.

The wellsite system 100 may further comprise flow sensors disposed in association with the pumps 202, the manifold unit 140, and/or the LP and HP fluid conduits 136, 138 in a manner permitting the sensing of fluid flow generated by the pumps 202. Each flow sensor is operable to generate an electrical signal and/or information indicative of the rate of fluid flow from a corresponding pump 202 to the manifold unit 140. For example, flow sensors 304 may be fluidly coupled along the HP fluid outlet conduits 235 of the pumps 202, as shown in FIG. 3. The flow sensors 304 may also be fluidly coupled along the HP fluid conduits 138 extending between the HP fluid outlet conduits 235 and the HP fluid inlet ports 172 of the manifold unit 140. The flow sensors 304 may also be disposed in association with the manifold unit 140. For example, the flow sensors 304 may be fluidly coupled with the HP fluid inlet ports 172.

The wellsite system 100 may further comprise pressure sensors disposed in association with the pumps 202, the manifold unit 140, and/or the LP and HP fluid conduits 136, 138 in a manner permitting the sensing of fluid pressure within the pumps 202, the manifold unit 140, and/or the LP and HP fluid conduits 136, 138. Each pressure sensor is may be operable to generate an electrical signal and/or information indicative of the fluid pressure within the pumps 202, the manifold unit 140, and/or the LP and HP fluid conduits 136, 138. For example, one or more pressure sensors 306 may extend through one or more of the cover plates 242 or other portions of the corresponding pump housing 216 to monitor pressure within the fluid outlet cavity 234 and, thus, the HP fluid outlet conduits 235 and the HP fluid conduits 138. The pressure sensors 306 may also be fluidly coupled along the HP fluid outlet conduits 235 and/or along the HP fluid conduits 138. Other pressure sensors, such as the pressure sensors 186, 187, 188 shown in FIG. 2, may be disposed in association with the manifold unit 140 to monitor the pressure within the manifolds 142, 144, 146.

The wellsite system 100 may further comprise a controller 310 in communication with the valve actuators 154, 158, 164, 168, 174, 178, 184 to permit the controller 310 to open and close or otherwise control the fluid valves 153, 157, 163, 167, 173, 177, 183. The controller 310 is further in communication with the valve feedback sensors 155, 159, 165, 169, 175, 179, 185 to permit the controller 310 to receive the feedback signals generated by the feedback sensors 155, 159, 165, 169, 175, 179, 185 and, thus, verify that the fluid valves 153, 157, 163, 167, 173, 177, 183 transitioned to the intended position or setting. The controller 310 is also in communication with the prime movers 204 and/or other portions of the pump units 200, such as may permit the controller 310 to activate, deactivate, shift transmission gears or speeds, or otherwise operate the pump units 200. The controller 310 is also in communication with the pressure sensors 186, 187, 188 associated with the manifold unit 140 and the pressure and flow sensors 306, 304 associated with each pump 202 or HP fluid conduit 138, such as may permit the controller 310 to receive the information indicative of fluid pressure and flow within the pumps 202, the HP fluid conduits 138, and/or the manifold 140. For clarity, the components in communication with the controller 310 will be collectively referred to hereinafter as "feedback and controlled components." Communication between the controller 310 and the feedback and controlled components may be via wired and/or wireless communication means. However, for clarity and ease of understanding, such communication means are not depicted in FIGS. 1-4, and a person having ordinary skill in the art will appreciate that myriad means for such communication means are within the scope of the present disclosure. The controller 310 may be implemented as part of the control/power center 133, or as a discrete component located externally from the control/power center 133.

Figure 5:
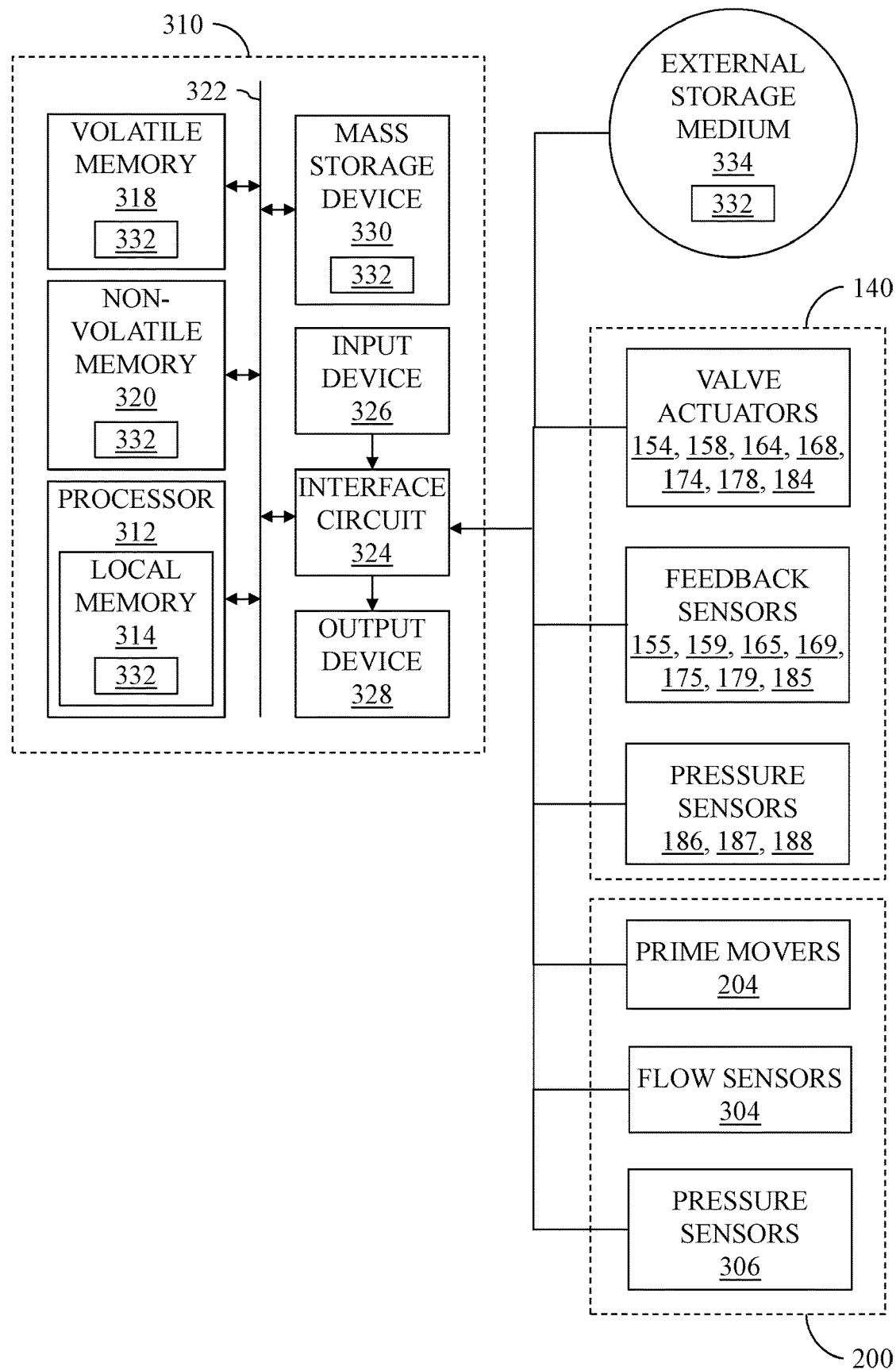
FIG. 5 is a schematic view of an example implementation of apparatus according to one or more aspects of the present disclosure.

FIG. 5 is a schematic view of at least a portion of an example implementation of the controller 310 according to one or more aspects of the present disclosure. The controller 310 may be operable to execute example machine-readable instructions to implement at least a portion of one or more of the example methods and/or processes described herein, and/or to implement at least a portion of one or more of the example systems described herein. The controller 310 may be or comprise, for example, one or more processors, special-purpose computing devices, servers, personal computers, personal digital assistant (PDA) devices, smartphones, internet appliances, and/or other types of computing devices.

The controller 310 may comprise a processor 312, such as a general-purpose programmable processor. The processor 312 may comprise a local memory 314, and may execute coded instructions 332 present in the local memory 314 and/or another memory device. The processor 312 may execute, among other things, machine-readable instructions or programs to implement the example methods and/or processes described herein. The programs stored in the local memory 314 may include program instructions or computer program code that, when executed by an associated processor, facilitate the pump units 200 and the manifold unit 140 to perform the example methods and/or processes described herein. The processor 312 may be, comprise, or be implemented by one or a plurality of processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 312 may be in communication with a main memory, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320. The controller 310 may be operable to store or record information entered by the human operators and/or information generated by the feedback and controlled components on the main memory.

The controller 310 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, and/or a cellular interface, among others. The interface circuit 324 may also comprise a graphics driver card. The interface circuit 324 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the feedback and controlled components may be connected with the controller 310 via the interface circuit 324, such as may facilitate communication between the feedback and controlled components and the controller 310.

To further facilitate communication between the manifold unit components and the controller 310, one or more of the feedback and controlled components may also comprise an interface circuit (not shown), which may permit signals or information generated by the feedback and controlled components to be sent to the controller 310 for monitoring and/or controlling operation of the one or more of the feedback and controlled components, or perhaps for monitoring and/or controlling operation of the entirety of the manifold unit 140. The interface circuits of the one or more of the feedback and controlled components may also permit signals to be received from the controller 310 to control operation of the one or more of the feedback and controlled components, or perhaps to control operation of the entirety of the manifold unit 140.

One or more input devices 326 may also be connected to the interface circuit 324. The input devices 326 may permit the human operators to enter the coded instructions 332, operational parameter thresholds, and/or other data into the processor 312. The input devices 326 may be, comprise, or be implemented by a keyboard, a mouse, a touchscreen, a track-pad, a trackball, an isopoint, and/or a voice recognition system, among other examples. One or more output devices 328 may also be connected to the interface circuit 324. The output devices 328 may be, comprise, or be implemented by display devices (e.g., a liquid crystal display (LCD) or cathode ray tube display (CRT), among others), printers, and/or speakers, among other examples. The controller 310 may also connect with one or more mass storage devices 330 and/or a removable storage medium 334, such as may be or include floppy disk drives, hard drive disks, compact disk (CD) drives, digital versatile disk (DVD) drives, and/or USB and/or other flash drives, among other examples.

The coded instructions 332, the operational parameter thresholds, and/or other data may be stored in the mass storage device 330, the volatile memory 318, the non-volatile memory 320, the local memory 314, and/or the removable storage medium 334. Thus, components of the controller 310 may be implemented in accordance with hardware (perhaps implemented in one or more chips including an integrated circuit, such as an application specific integrated circuit), or may be implemented as software or firmware for execution by the processor 312. In the case of firmware or software, the implementation may be provided as a computer program product including a computer readable medium or storage structure embodying computer program code (i.e., software or firmware) thereon for execution by the processor 312.

The coded instructions 332 may include program instructions or computer program code that, when executed by the processor 312, may cause the wellsite system 100 (or at least components thereof) to perform methods and processes as described herein. For example, the controller 310 may cause the pump units 200, the manifold unit 140, and the feedback and controlled components to conduct and/or undergo depressurizing and flushing operations, such as to permit the pump units 200 and the manifold unit 140 to be safely fluidly disconnected. The controller 310 may also assess operational health of the fluid valves 153, 157, 163, 167, 173, 177, 183 and/or the sensors 186, 187, 188, 304, 306 before and/or after the depressurizing and flushing operations or other pumping operations.

The operational parameter thresholds may be entered into the controller 310 by the human operators to be processed by the processor 312 prior to or during the depressurizing and flushing operations. The operational parameter thresholds may include a predetermined fluid pressure threshold (hereinafter referred to as the "pressure threshold"). When the fluid pressure within the HP fluid conduit 138 and perhaps portions of the pump unit 200 and the manifold unit 140 in fluid communication with the HP fluid conduit 138 is greater than the pressure threshold, the HP fluid conduit 138 and portions of the pump unit 200 and the manifold unit 140 in fluid communication with the HP fluid conduit 138 may be considered to be pressurized or under pressure. However, when the fluid pressure within the HP fluid conduit 138 and portions of the pump unit 200 and the manifold unit 140 in fluid communication with the HP fluid conduit 138 is less than the pressure threshold, the HP fluid conduit 138 and portions of the pump unit 200 and the manifold unit 140 in fluid communication with the HP fluid conduit 138 may be considered to be substantially depressurized or not under pressure. When the HP fluid conduit 138 and portions of the pump unit 200 and the manifold unit 140 in fluid communication with the HP fluid conduits 138 are not under pressure, the pump unit 200 may be caused to cease operation and the pump unit 200 may be fluidly uncoupled from the manifold 140. In an example implementation, the pressure threshold may include a fluid pressure ranging between about zero PSI and about fifteen PSI.

Another operational parameter threshold may include a predetermined fluid flow rate threshold (hereinafter referred to as the "flow threshold"). When a fluid flow rate between the pump units 200 and the manifold unit 140 through the corresponding HP fluid conduits 138 is greater than the flow threshold, the HP fluid conduit 138 and perhaps portions of the pump unit 200 in fluid communication with the HP fluid conduit 138 may be considered containing fluid or not flushed. However, when the fluid flow rate between the pump unit 200 and the manifold unit 140 through the corresponding HP fluid conduit 138 is less than the flow threshold, the HP fluid conduit 138 and portions of the pump unit 200 in fluid communication with the HP fluid conduit 138 may be considered substantially free of fluid or flushed. When the HP fluid conduit 138 and portions of the pump unit 200 in fluid communication with the HP fluid conduit 138 are substantially flushed, the pump unit 200 may be caused to cease operation and the pump unit 200 may be fluidly uncoupled from the manifold 140. In an example implementation, the flow threshold may include a fluid flow rate ranging between about zero GPM and about one GPM. Accordingly, the coded instructions 332, when executed, may further cause the controller 310 to receive and process the pressure and flow thresholds entered by the human operators.

To depressurize an HP fluid conduit 138 and portions of a pump units 200 and the manifold unit 140 in fluid communication with the HP fluid conduit 138, the controller 310 may cause the pump unit 200 to operate and then cause the LP fluid valves 157, 167 corresponding to the pump unit 200 to transition to the closed flow position and cause the HP fluid valve 173 corresponding to the pump unit 200 and/or the fluid bleed valve 183 corresponding to the pump unit 200 to transition to the open flow position. Afterwards, the controller 310 may determine that the HP fluid conduit 138 corresponding to the pump unit 200 is not pressurized based on the information generated by the corresponding one of the pressure sensors 188, 306. The controller 310 may be operable to determine whether the HP fluid conduit 138 corresponding to the pump unit 200 is not pressurized by comparing the pressure threshold to the fluid pressure indicated by the information generated by a corresponding pressure sensor 188, 306.

The controller 310 may also determine whether the HP fluid conduit 138 corresponding to the pump unit 200 and portions of the pump unit 200 in fluid communication with the HP fluid conduit 138 is substantially flushed based on the information generated by a corresponding one of the flow sensors 304. The controller 310 may be operable to determine whether the HP fluid conduit 138 corresponding to the pump unit 200 is substantially flushed by comparing the flow threshold to the fluid flow rate indicated by the information generated by the corresponding one of the flow sensors 304, wherein the HP fluid conduit 138 is considered substantially flushed when the flow threshold is greater than the fluid flow rate indicated by the information generated by the corresponding one of the flow sensors 304.

Before the pump units 200 are activated, the human operators may perform several safety and operational health assessments. For example, the human operators may visually check that no other human operators are present near the pump units 200 and the manifold unit 140. The human operators may also visually inspect the LP and HP fluid conduits 136, 138 and other associated fluid conduits and/or couplings to check for leaks and physical damage. The human operators may also visually and/or manually asses if the various sensors and fluid valves associated with the pump units 200 and the manifold unit 140 are functioning properly. For example, the human operators may check if the pressure sensors 186, 187, 188, 306, the flow sensors 304, and the fluid valves 153, 157, 163, 167, 173, 177, 183 are operationally healthy. If one or more of these safety and operational health assessments identify a safety or functionality problem, the human operators may abort the depressurizing and flushing operations before the pump units 200 are activated.

Instead of or in addition to the human operators performing the safety and operational health assessments, the coded instructions 332, when executed, may further cause the controller 310 to assess safety conditions and functionality or operational health of the sensors 186, 187, 188, 304, 306 and/or the fluid valves 153, 157, 163, 167, 173, 177, 183. For example, the controller 310 may be operable to transmit diagnostic signals to one or more of the pressure sensors 186, 187, 188, 306, the flow sensors 304, and the fluid valves 153, 157, 163, 167, 173, 177, 183 and receive corresponding feedback signals indicative of the operational health of these components.

To assess the operational health of the fluid valves 153, 157, 163, 167, 173, 177, 183, before and/or after the depressurizing and flushing operations, the controller 310 may be operable to, with respect to each of the fluid valves 153, 157, 163, 167, 173, 177, 183, remotely control the fluid valve 153, 157, 163, 167, 173, 177, 183 by transmitting a command signal to the fluid valve 153, 157, 163, 167, 173, 177, 183 to transition the fluid valve 153, 157, 163, 167, 173, 177, 183 from an existing setting to an intended setting. After transmitting the command signal, the controller 310 may receive a feedback signal from the fluid valves 153, 157, 163, 167, 173, 177, 183 indicative of an actual setting of the fluid valve 153, 157, 163, 167, 173, 177, 183 and assess an operational health of the fluid valve 153, 157, 163, 167, 173, 177, 183 based on the intended and actual settings. If the intended and actual settings are different, than the fluid valves 153, 157, 163, 167, 173, 177, 183 may be determined to be faulty or not healthy. To further verify if the fluid valves 153, 157, 163, 167, 173, 177, 183 are healthy, the fluid valves 153, 157, 163, 167, 173, 177, 183 may be transitioned and reassessed additional number of times.

The operational health of the fluid valves 153, 157, 163, 167, 173, 177, 183 may be assessed simultaneously, wherein the controller 310 simultaneously transmits the command signals to the fluid valves 153, 157, 163, 167, 173, 177, 183, and assesses the operational health of the fluid valves 153, 157, 163, 167, 173, 177, 183 based on the intended and actual settings. The operational health of the fluid valves 153, 157, 163, 167, 173, 177, 183 may also be checked sequentially, wherein the controller 310 transmits the command signals to each of the fluid valves 153, 157, 163, 167, 173, 177, 183 one at a time, and assesses the operational health of one of the fluid valves 153, 157, 163, 167, 173, 177, 183 based on the intended and actual settings before transmitting a command signal to another one of the fluid valves 153, 157, 163, 167, 173, 177, 183.

If the controller 310 determines that one or more of the sensors 186, 187, 188, 306 and fluid valves 153, 157, 163, 167, 173, 177, 183 are not healthy, the controller 310 may abort the depressurizing and flushing operations before activating the pump units 200.

Figure 6:
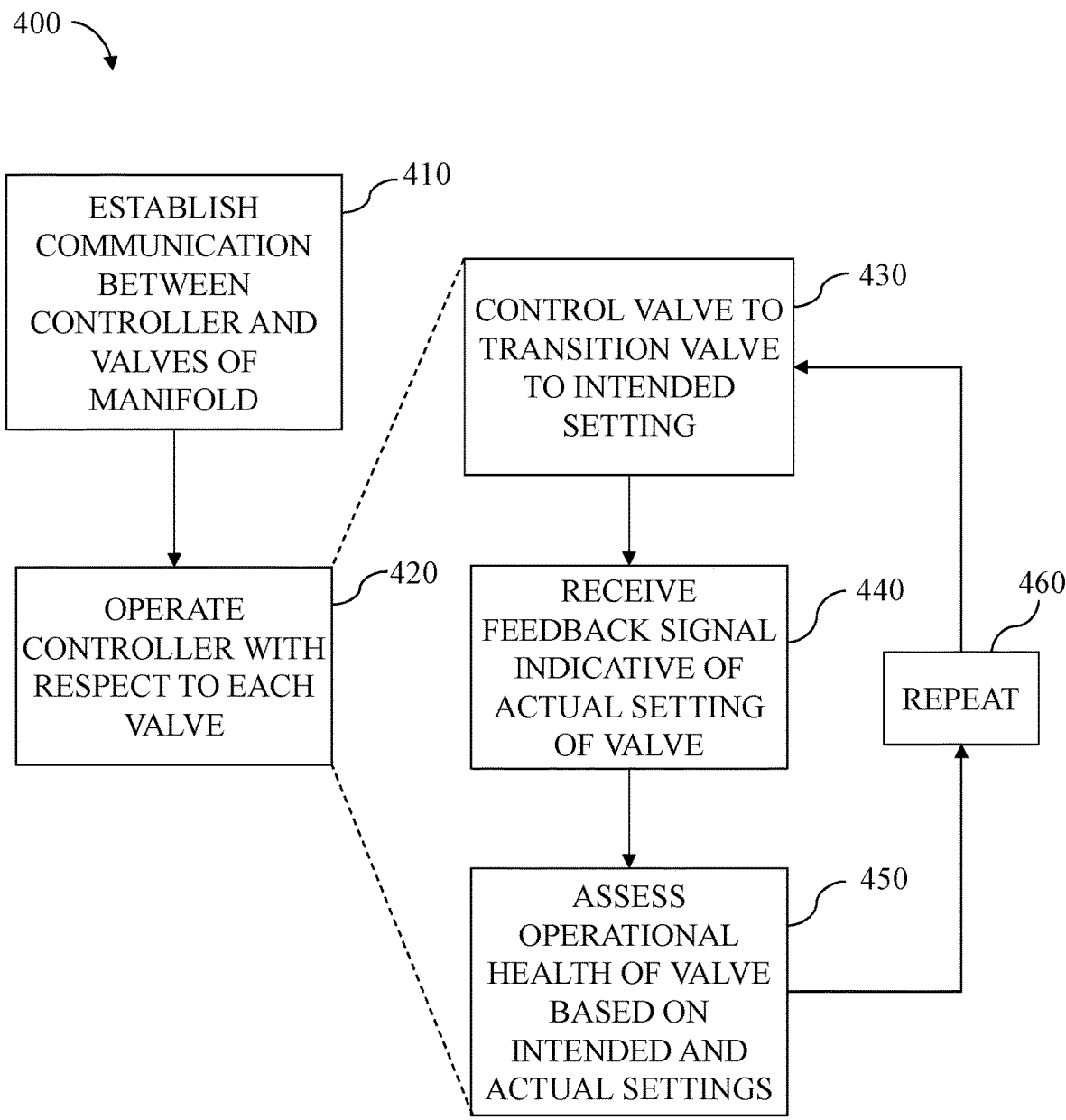
FIG. 6 is a flow-chart diagram of at least a portion of an example implementation of a method according to one or more aspects of the present disclosure.

FIG. 6 is a flow-chart diagram of at least a portion of an example implementation of a method (400) according to one or more aspects of the present disclosure. The method (400) may be performed utilizing at least a portion of one or more implementations of the apparatus shown in one or more of FIGS. 1-5 and/or otherwise within the scope of the present disclosure.

The method (400) comprises establishing (410) communication between the controller 310 and each of the plurality of valves 153, 157, 163, 167, 173, 177, 183 of a manifold unit 140, wherein each of the valves 153, 157, 163, 167, 173, 177, 183 is operable to control flow through a corresponding one of a plurality of ports 152, 156, 162, 166, 172, 176, 182 of the manifold unit 140. The method (400) further comprises operating (420) the controller 310, with respect to each of the valves 153, 157, 163, 167, 173, 177, 183, to remotely control (430) the valve 153, 157, 163, 167, 173, 177, 183 by transmitting a command signal to the valve 153, 157, 163, 167, 173, 177, 183 to transition the valve 153, 157, 163, 167, 173, 177, 183 from an existing setting to an intended setting, after transmitting the command signal, receive (440) a feedback signal from the valve 153, 157, 163, 167, 173, 177, 183 indicative of an actual setting of the valve 153, 157, 163, 167, 173, 177, 183, and assess (450) an operational health of the valve based on the intended and actual settings.

The operating (430), receiving (440), and assessing (450) may be repeated additional times for each valve 153, 157, 163, 167, 173, 177, 183, such that the command signal is a first command signal, the feedback signal is a first feedback signal, the intended setting is a first intended setting, and the actual setting is a first actual setting. Accordingly, the method (400) may further comprise operating the controller 310 to, with respect to each of the valves 153, 157, 163, 167, 173, 177, 183, further remotely control the valve 153, 157, 163, 167, 173, 177, 183 by transmitting a second command signal to the valve 153, 157, 163, 167, 173, 177, 183 to transition the valve 153, 157, 163, 167, 173, 177, 183 to a second intended setting. After transmitting the second command signal, the controller 310 may receive a second feedback signal from the valve 153, 157, 163, 167, 173, 177, 183 indicative of a second actual setting of the valve and reassess the operational health of the valve 153, 157, 163, 167, 173, 177, 183 based on the second intended setting and the second actual setting. The first intended setting may be a closed flow setting and the second intended setting may be an open flow setting.

The method (400) may also comprise operating the controller 310 to, with respect to each of the valves 153, 157, 163, 167, 173, 177, 183, remotely control the valve 153, 157, 163, 167, 173, 177, 183 by transmitting a third command signal to the valve 153, 157, 163, 167, 173, 177, 183 to transition the valve 153, 157, 163, 167, 173, 177, 183 to a third intended setting. After transmitting the third command signal, the controller 310 may receive a third feedback signal from the valve 153, 157, 163, 167, 173, 177, 183 indicative of a third actual setting of the valve 153, 157, 163, 167, 173, 177, 183, and reassess the operational health of the valve 153, 157, 163, 167, 173, 177, 183 based on the third intended setting and the third actual setting. The third intended setting may be a closed flow setting.

The method (400) may also include operating the controller 310 with respect to each of the valves 153, 157, 163, 167, 173, 177, 183 one at a time. The plurality of valves 153, 157, 163, 167, 173, 177, 183 may comprise a first valve, a second valve, and a third valve. Accordingly, operating the controller 310 may include remotely controlling the first valve by transmitting a first command signal to the first valve to transition the first valve to a first intended setting, then receiving a first feedback signal from the first valve indicative of a first actual setting of the first valve, and then assessing a first operational health of the first valve based on the first intended setting and the first actual setting. The method may further include, after assessing the first operational health, remotely controlling the second valve by transmitting a second command signal to the second valve to transition the second valve to a second intended setting, then receiving a second feedback signal from the second valve indicative of a second actual setting of the second valve, and then assessing a second operational health of the second valve based on the second intended setting and the second actual setting. The method (400) may also include, after assessing the second operational health, remotely controlling the third valve by transmitting a third command signal to the third valve to transition the third valve to a third intended setting, then receiving a third feedback signal from the third valve indicative of a third actual setting of the third valve, and then assessing a third operational health of the third valve based on the third intended setting and the third actual setting.

Figure 7:
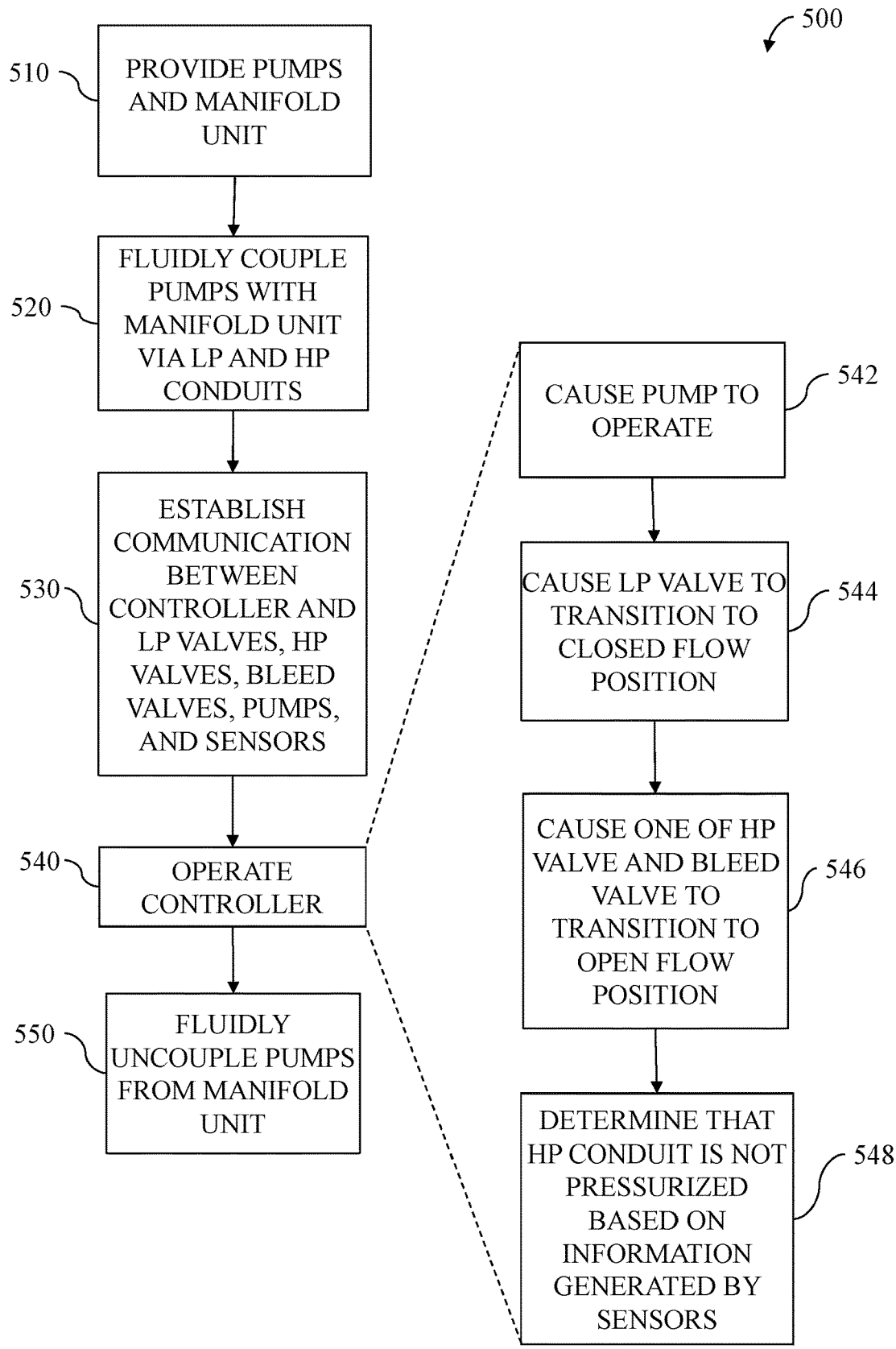
FIG. 7 is a flow-chart diagram of at least a portion of an example implementation of a method according to one or more aspects of the present disclosure.

FIG. 7 is a flow-chart diagram of at least a portion of a method (500) according to one or more aspects of the present disclosure. The method (500) may be performed utilizing at least a portion of one or more implementations of the apparatus shown in one or more of FIGS. 1-5 and/or otherwise within the scope of the present disclosure.

The method (500) may include providing (510) a plurality of pumps (200) and a manifold unit (140), fluidly coupling (520) each of the pumps (200) with the LP manifold 142, 144 via a plurality of LP conduits 136 each fluidly coupling (520) a corresponding one of the pumps (200) with a corresponding one of the LP ports 156, 166, and fluidly coupling (520) each of the pumps (200) with the HP manifold 146 via a plurality of HP conduits 138 each fluidly coupling a corresponding one of the pumps (200) with a corresponding one of the HP ports 172. The method (500) further comprises establishing (530) communication between a controller 310 and each of the LP valves 157, 167, the HP valves 173, the bleed valves 183, the pumps 200, and a plurality of sensors 188, 306 each operable to generate information indicative of fluid pressure within a corresponding one of the HP conduits 138. The method (500) further includes operating (540) the controller 310 to, with respect to each of the pumps 200, cause (542) the pump 200 to operate and then cause (544) the LP valves 157, 167 corresponding to the pump 200 to transition to a closed flow position and cause (546) one of the HP valve 173 corresponding to the pump 200 and the bleed valve 183 corresponding to the pump 200 to transition to an open flow position. The controller 310 may also be utilized to determine (548) that the HP conduit 138 corresponding to the pump 200 is not pressurized based on the information generated by the corresponding one of the sensors 188, 306. With respect to each of the pumps 200, after the controller 310 determines that the HP conduit 138 corresponding to the pump 200 is not pressurized, the pump 200 may be fluidly uncoupled (550) from the manifold unit 140.

The method (500) may also comprise, prior to transitioning (544, 546) the LP valves 157, 167, the HP valve 173, and the bleed valve 183, operating the controller 310 to, with respect to each of the pumps 200, confirm that the LP valve 157, 167 corresponding to the pump 200 is in the closed flow position and confirm that the one of the HP valve 173 corresponding to the pump 200 and the bleed valve 183 corresponding to the pump 200 is in the open flow position.

The method (500) may further comprise, prior to causing (542) the pump 200 to operate and/or after causing the pump 200 to cease to operate, operating the controller 310 to, with respect to each of the pumps 200, remotely control the LP, HP, and bleed valves 157, 167, 173, 183 corresponding to the pump 200 by transmitting corresponding command signals to the LP, HP, and bleed valves 157, 167, 173, 183 to transition the LP, HP, and bleed valves 157, 167, 173, 183 from corresponding existing settings to corresponding intended settings. After transmitting the command signals, the controller 310 may receive corresponding feedback signals from the LP, HP, and bleed valves 157, 167, 173, 183 corresponding to the pump 200, the feedback signals being indicative of corresponding actual settings of the LP, HP, and bleed valves 157, 167, 173, 183, such that the controller may be utilized to assess an operational health of each of the LP, HP, and bleed valves 157, 167, 173, 183 corresponding to the pump 200 based on the corresponding intended and actual settings.

After operating the controller 310 to cause the transition (544, 546) of the LP valves 157, 167 and the one of the HP and bleed valves 173, 183 corresponding to each of the pumps 200, the controller 310 may be operated to cause each of the pumps 200 to operate at an increased flow output, such as to increase fluid suction, fluid velocity, or otherwise increase the ability for the pump units 200 to expel the fluid from the HP fluid conduits 138 and, perhaps, portions of the pumps 202 in fluid communication with the HP fluid conduits 138.

The plurality of sensors 188, 306 may be pressure sensors 188, 306, and the method may further comprise establishing communication between the controller 310 and each of a plurality of flow sensors 304 operable to generate information indicative of rate of fluid flow within a corresponding one of the HP conduits 138. The controller 310 may thus also be utilized to, with respect to each of the pumps 200, determine whether the HP conduit 138 corresponding to the pump 200 is substantially flushed based on the information generated by the corresponding one of the flow sensors 304. The controller 310 may also be operated to, with respect to each of the pumps 200, cease operation of the pump 200 after the controller 310 determines that the HP conduit 138 corresponding to the pump 200 is substantially flushed.

In view of the entirety of the present disclosure, including the figures and the claims, a person having ordinary skill in the art will readily recognize that the present disclosure introduces an apparatus comprising: (a) a manifold unit comprising a plurality of ports and a plurality of valves, wherein each of the valves is operable to control flow through a corresponding one of the ports; and (b) a controller operable to, with respect to each of the valves: (1) remotely control the valve by transmitting a command signal to the valve to transition the valve from an existing setting to an intended setting; (2) after transmitting the command signal, receive a feedback signal from the valve indicative of an actual setting of the valve; and (3) assess an operational health of the valve based on the intended and actual settings.

The command signal may be a first command signal, the feedback signal may be a first feedback signal, the intended setting may be a first intended setting, the actual setting may be a first actual setting, and the controller may be further operable to, with respect to each of the valves: further remotely control the valve by transmitting a second command signal to the valve to transition the valve to a second intended setting; after transmitting the second command signal, receive a second feedback signal from the valve indicative of a second actual setting of the valve; and reassess the operational health of the valve based on the second intended setting and the second actual setting. The first intended setting may be a closed flow setting, and the second intended setting may be an open flow setting. The controller may be further operable to, with respect to each of the valves: further remotely control the valve by transmitting a third command signal to the valve to transition the valve to a third intended setting; after transmitting the third command signal, receive a third feedback signal from the valve indicative of a third actual setting of the valve; and reassess the operational health of the valve based on the third intended setting and the third actual setting. The third intended setting may be a closed flow setting.

The plurality of valves may comprise a first valve, a second valve, and a third valve, and the controller may be operable to: remotely control the first valve by transmitting a first command signal to the first valve to transition the first valve to a first intended setting, then receive a first feedback signal from the first valve indicative of a first actual setting of the first valve, and then assess a first operational health of the first valve based on the first intended setting and the first actual setting; after assessing the first operational health, remotely control the second valve by transmitting a second command signal to the second valve to transition the second valve to a second intended setting, then receive a second feedback signal from the second valve indicative of a second actual setting of the second valve, and then assess a second operational health of the second valve based on the second intended setting and the second actual setting; and after assessing the second operational health, remotely control the third valve by transmitting a third command signal to the third valve to transition the third valve to a third intended setting, then receive a third feedback signal from the third valve indicative of a third actual setting of the third valve, and then assess a third operational health of the third valve based on the third intended setting and the third actual setting.

The present disclosure also introduces a method comprising: (a) establishing communication between a controller and each of a plurality of valves of a manifold unit, wherein each of the valves is operable to control flow through a corresponding one of a plurality of ports of the manifold unit; and (b) operating the controller to, with respect to each of the valves: (1) remotely control the valve by transmitting a command signal to the valve to transition the valve from an existing setting to an intended setting; (2) after transmitting the command signal, receive a feedback signal from the valve indicative of an actual setting of the valve; and (3) assess an operational health of the valve based on the intended and actual settings.

The command signal may be a first command signal, the feedback signal may be a first feedback signal, the intended setting may be a first intended setting, the actual setting may be a first actual setting, and the method may further comprise operating the controller to, with respect to each of the valves: further remotely control the valve by transmitting a second command signal to the valve to transition the valve to a second intended setting; after transmitting the second command signal, receive a second feedback signal from the valve indicative of a second actual setting of the valve; and reassess the operational health of the valve based on the second intended setting and the second actual setting. The first intended setting may be a closed flow setting, and the second intended setting may be an open flow setting. The method may further comprise operating the controller to, with respect to each of the valves: further remotely control the valve by transmitting a third command signal to the valve to transition the valve to a third intended setting; after transmitting the third command signal, receive a third feedback signal from the valve indicative of a third actual setting of the valve; and reassess the operational health of the valve based on the third intended setting and the third actual setting. The third intended setting may be a closed flow setting.

The plurality of valves may comprise a first valve, a second valve, and a third valve, and operating the controller may include: remotely controlling the first valve by transmitting a first command signal to the first valve to transition the first valve to a first intended setting, then receiving a first feedback signal from the first valve indicative of a first actual setting of the first valve, and then assessing a first operational health of the first valve based on the first intended setting and the first actual setting; after assessing the first operational health, remotely controlling the second valve by transmitting a second command signal to the second valve to transition the second valve to a second intended setting, then receiving a second feedback signal from the second valve indicative of a second actual setting of the second valve, and then assessing a second operational health of the second valve based on the second intended setting and the second actual setting; and after assessing the second operational health, remotely controlling the third valve by transmitting a third command signal to the third valve to transition the third valve to a third intended setting, then receiving a third feedback signal from the third valve indicative of a third actual setting of the third valve, and then assessing a third operational health of the third valve based on the third intended setting and the third actual setting.

The present disclosure also introduces an apparatus comprising: (a) a manifold unit comprising: (1) a low-pressure (LP) manifold having a plurality of LP ports; (2) a plurality of LP valves each operable to control flow through a corresponding one of the LP ports; (3) a high-pressure (HP) manifold having a plurality of HP ports; (4) a plurality of HP valves each operable to control flow through a corresponding one of the HP ports; (5) a plurality of bleed ports each fluidly coupled with a corresponding one of the HP ports; and (6) a plurality of bleed valves each fluidly coupled with and remotely operable to control flow through a corresponding one of the bleed ports from the corresponding HP port;

(b) a plurality of pumps; (c) a plurality of LP conduits each fluidly coupling a corresponding one of the pumps and a corresponding one of the LP ports; (d) a plurality of HP conduits each fluidly coupling a corresponding one of the pumps and a corresponding one of the HP ports; (e) a plurality of sensors each operable to generate information indicative of fluid pressure within a corresponding one of the HP conduits; and (f) a controller in communication with the LP valves, the HP valves, the bleed valves, the sensors, and the pumps, wherein the controller is operable to, with respect to each of the pumps: (1) cause the LP valve corresponding to the pump to transition to a closed flow position; (2) cause one of the HP valve corresponding to the pump and the bleed valve corresponding to the pump to transition to an open flow position; and (3) determine whether the HP conduit corresponding to the pump is pressurized based on the information generated by the corresponding one of the sensors.

With respect to each of the pumps, the controller may be operable to determine whether the HP conduit corresponding to the pump is pressurized by comparing a predetermined threshold to the fluid pressure indicated by the information generated by the corresponding one of the sensors.

With respect to each of the pumps, the controller may be further operable to: determine whether the LP valve corresponding to the pump is in the closed flow position; and determine whether the one of the HP valve corresponding to the pump and the bleed valve corresponding to the pump is in the open flow position.

Prior to causing the transition of the LP, HP, and/or bleed valves corresponding to each of the pumps, the controller may be further operable to cause each of the pumps to commence operation.

Prior to causing each of the pumps to commence operation, the controller may be further operable to, with respect to each of the pumps: remotely control the LP, HP, and bleed valves corresponding to the pump by transmitting corresponding command signals to the LP, HP, and bleed valves to transition the LP, HP, and bleed valves to corresponding intended settings; after transmitting the command signals, receive corresponding feedback signals from the LP, HP, and bleed valves corresponding to the pump, wherein the feedback signals are indicative of corresponding actual settings of the LP, HP, and bleed valves; and assess an operational health of each of the LP, HP, and bleed valves corresponding to the pump based on the corresponding intended and actual settings.

The controller may be further operable to, after causing the transitions of the LP valve and the one of the HP and bleed valves corresponding to each of the pumps, cause each of the pumps to operate at an increased flow output.

The plurality of sensors may be a plurality of pressure sensors, the apparatus may further comprise a plurality of flow sensors in communication with the controller and each operable to generate information indicative of rate of fluid flow through a corresponding one of HP conduits, and the controller may be further operable to, with respect to each of the pumps, determine whether the HP conduit corresponding to the pump is substantially flushed based on the information generated by the corresponding one of the flow sensors. With respect to each of the pumps, the controller may be further operable to determine whether the HP conduit corresponding to the pump is substantially flushed by comparing a predetermined threshold to the flow rate indicated by the information generated by the corresponding one of the flow sensors, and the HP conduit may be substantially flushed when the predetermined threshold is greater than the flow rate indicated by the information generated by the corresponding one of the flow sensors. The controller may be further operable to cause each of the pumps to cease operation after determining that the HP conduits corresponding to each of the pumps are each substantially flushed. After causing each of the pumps to cease operation, the controller may be further operable to, with respect to each of the pumps: remotely control the LP, HP, and bleed valves corresponding to the pump by transmitting corresponding command signals to the LP, HP, and bleed valves to transition the LP, HP, and bleed valves to corresponding intended settings; after transmitting the command signals, receive corresponding feedback signals from the LP, HP, and bleed valves corresponding to the pump, wherein the feedback signals are indicative of corresponding actual settings of the LP, HP, and bleed valves; and assess an operational health of each of the LP, HP, and bleed valves corresponding to the pump based on the corresponding intended and actual settings.

The present disclosure also introduces a method comprising: (a) providing a plurality of pumps and a manifold unit, wherein the manifold unit comprises: (1) a low-pressure (LP) manifold having a plurality of LP ports; (2) a plurality of LP valves each operable to control flow through a corresponding one of the LP ports; (3) a high-pressure (HP) manifold having a plurality of HP ports; (4) a plurality of HP valves each operable to control flow through a corresponding one of the HP ports; (5) a plurality of bleed ports each fluidly coupled with a corresponding one of the HP ports; and (6) a plurality of bleed valves each fluidly coupled with and remotely operable to control flow through a corresponding one of the bleed ports from the corresponding HP port; (b) fluidly coupling each of the pumps with the LP manifold via a plurality of LP conduits each fluidly coupling a corresponding one of the pumps with a corresponding one of the LP ports; (c) fluidly coupling each of the pumps with the HP manifold via a plurality of HP conduits each fluidly coupling a corresponding one of the pumps with a corresponding one of the HP ports; (d) establishing communication between a controller and each of the LP valves, the HP valves, the bleed valves, the pumps, and a plurality of sensors each operable to generate information indicative of fluid pressure within a corresponding one of the HP conduits; and (e) operating the controller to, with respect to each of the pumps: (1) cause the pump to operate and then: (i) cause the LP valve corresponding to the pump to transition to a closed flow position; and (ii) cause one of the HP valve corresponding to the pump and the bleed valve corresponding to the pump to transition to an open flow position; and (2) then determine that the HP conduit corresponding to the pump is not pressurized based on the information generated by the corresponding one of the sensors.

The method may further comprise, with respect to each of the pumps, fluidly uncoupling the pump from the manifold unit after the controller determines that the HP conduit corresponding to the pump is not pressurized.

The method may further comprise operating the controller to, with respect to each of the pumps: confirm that the LP valve corresponding to the pump is in the closed flow position; and confirm that the one of the HP valve corresponding to the pump and the bleed valve corresponding to the pump is in the open flow position.

The method may further comprise operating the controller to, with respect to each of the pumps: remotely control the LP, HP, and bleed valves corresponding to the pump by transmitting corresponding command signals to the LP, HP, and bleed valves to transition the LP, HP, and bleed valves from corresponding existing settings to corresponding intended settings; after transmitting the command signals, receive corresponding feedback signals from the LP, HP, and bleed valves corresponding to the pump indicative of corresponding actual settings of the LP, HP, and bleed valves; and assess an operational health of each of the LP, HP, and bleed valves corresponding to the pump based on the corresponding intended and actual settings.

The method may further comprise, after operating the controller to cause the transition of the LP valve and the one of the HP and bleed valves corresponding to each of the pumps, operating the controller to cause each of the pumps to operate at an increased flow output.

The plurality of sensors may be a plurality of pressure sensors, the method may further comprise establishing communication between the controller and each of a plurality of flow sensors operable to generate information indicative of rate of fluid flow within a corresponding one of the HP conduits, and the controller may be operable to, with respect to each of the pumps, determine whether the HP conduit corresponding to the pump is substantially flushed based on the information generated by the corresponding one of the flow sensors. The method may further comprise operating the controller to, with respect to each of the pumps, cease operation of the pump after the controller determines that the HP conduit corresponding to the pump is substantially flushed.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus comprising:
    a manifold unit comprising a plurality of ports and a plurality of valves and a plurality of valve feedback sensors attached to each of the valves, wherein each of the valves is operable to control flow through a corresponding one of the ports; and
    a controller operable to, with respect to each of the valves:
        remotely control the valve by transmitting a command signal to the valve to transition the valve from an existing setting to an intended setting;
        after transmitting the command signal, receive a feedback signal from the valve feedback sensors indicative of an actual setting of the valve;
        assess an operational health of the valve based on a comparison of the intended and actual settings; and
        aborting an operation of the manifold unit based on an assessment, by the controller, that the operational health of the valve is unhealthy.

2. The apparatus of claim 1 wherein the command signal is a first command signal, the feedback signal is a first feedback signal, the intended setting is a first intended setting, the actual setting is a first actual setting, and the controller is further operable to, with respect to each of the valves:
    further remotely control the valve by transmitting a second command signal to the valve to transition the valve to a second intended setting;
    after transmitting the second command signal, receive a second feedback signal from the valve indicative of a second actual setting of the valve; and
    reassess the operational health of the valve based on the second intended setting and the second actual setting;
    wherein the first intended setting is a closed flow setting and the second intended setting is an open flow setting.

3. The apparatus of claim 2 wherein the controller is further operable to, with respect to each of the valves:
    further remotely control the valve by transmitting a third command signal to the valve to transition the valve to a third intended setting;
    after transmitting the third command signal, receive a third feedback signal from the valve indicative of a third actual setting of the valve; and
    reassess the operational health of the valve based on the third intended setting and the third actual setting;
    wherein the third intended setting is a closed flow setting.

4. The apparatus of claim 1 wherein the plurality of valves comprises a first valve, a second valve, and a third valve, and wherein the controller is operable to:
    remotely control the first valve by transmitting a first command signal to the first valve to transition the first valve to a first intended setting, then receive a first feedback signal from the first valve indicative of a first actual setting of the first valve, and then assess a first operational health of the first valve based on the first intended setting and the first actual setting;
    after assessing the first operational health, remotely control the second valve by transmitting a second command signal to the second valve to transition the second valve to a second intended setting, then receive a second feedback signal from the second valve indicative of a second actual setting of the second valve, and then assess a second operational health of the second valve based on the second intended setting and the second actual setting; and
    after assessing the second operational health, remotely control the third valve by transmitting a third command signal to the third valve to transition the third valve to a third intended setting, then receive a third feedback signal from the third valve indicative of a third actual setting of the third valve, and then assess a third operational health of the third valve based on the third intended setting and the third actual setting.

5. The apparatus of claim 1 wherein aborting the operation comprises aborting a depressurizing and flushing operation.

6. A method comprising:
    establishing communication between a controller and each of a plurality of valves of a manifold unit, wherein each of the valves is operable to control flow through a corresponding one of a plurality of ports of the manifold unit and wherein each of the valves has a valve feedback sensor attached thereto; and
    operating the controller to, with respect to each of the valves:
        remotely control the valve by transmitting a command signal to the valve to transition the valve from an existing setting to an intended setting;

after transmitting the command signal, receive a feedback signal from the valve feedback sensor indicative of an actual setting of the valve;
assess an operational health of the valve based on a comparison of the intended and actual settings; and
aborting an operation of the manifold unit based on an assessment, by the controller, that the operational health of the valve is unhealthy.

7. The method of claim 6 wherein the command signal is a first command signal, the feedback signal is a first feedback signal, the intended setting is a first intended setting, the actual setting is a first actual setting, and wherein the method further comprises operating the controller to, with respect to each of the valves:
further remotely control the valve by transmitting a second command signal to the valve to transition the valve to a second intended setting;
after transmitting the second command signal, receive a second feedback signal from the valve indicative of a second actual setting of the valve; and
reassess the operational health of the valve based on the second intended setting and the second actual setting;
wherein the first intended setting is a closed flow setting and the second intended setting is an open flow setting.

8. The method of claim 7 further comprising operating the controller to, with respect to each of the valves:
further remotely control the valve by transmitting a third command signal to the valve to transition the valve to a third intended setting;
after transmitting the third command signal, receive a third feedback signal from the valve indicative of a third actual setting of the valve; and
reassess the operational health of the valve based on the third intended setting and the third actual setting;
wherein the third intended setting is a closed flow setting.

9. The method of claim 7 wherein the plurality of valves comprises a first valve, a second valve, and a third valve, and wherein operating the controller includes:
remotely controlling the first valve by transmitting a first command signal to the first valve to transition the first valve to a first intended setting, then receiving a first feedback signal from the first valve indicative of a first actual setting of the first valve, and then assessing a first operational health of the first valve based on the first intended setting and the first actual setting;
after assessing the first operational health, remotely controlling the second valve by transmitting a second command signal to the second valve to transition the second valve to a second intended setting, then receiving a second feedback signal from the second valve indicative of a second actual setting of the second valve, and then assessing a second operational health of the second valve based on the second intended setting and the second actual setting; and
after assessing the second operational health, remotely controlling the third valve by transmitting a third command signal to the third valve to transition the third valve to a third intended setting, then receiving a third feedback signal from the third valve indicative of a third actual setting of the third valve, and then assessing a third operational health of the third valve based on the third intended setting and the third actual setting.

10. The method of claim 6 wherein aborting the operation comprises aborting a depressurizing and flushing operation.

11. An apparatus comprising:
a manifold unit comprising:
a low-pressure (LP) manifold having a plurality of LP ports;
a plurality of LP valves each operable to control flow through a corresponding one of the LP ports;
a high-pressure (HP) manifold having a plurality of HP ports;
a plurality of HP valves each operable to control flow through a corresponding one of the HP ports;
a plurality of bleed ports each fluidly coupled with a corresponding one of the HP ports;
a plurality of bleed valves each fluidly coupled with and remotely operable to control flow through a corresponding one of the bleed ports from the corresponding HP port; and
a plurality of valve feedback sensors each associated with a one of the LP valves, the HP valves and the bleed valves;
a plurality of pumps;
a plurality of LP conduits each fluidly coupling a corresponding one of the pumps and a corresponding one of the LP ports;
a plurality of HP conduits each fluidly coupling a corresponding one of the pumps and a corresponding one of the HP ports;
a plurality of conduit feedback sensors each operable to generate information indicative of fluid pressure within a corresponding one of the HP conduits; and
a controller in communication with the LP valves, the HP valves, the bleed valves, the valve feedback sensors, the conduit feedback sensors, and the pumps, wherein the controller is operable to, with respect to each of the pumps:
cause the LP valve corresponding to the pump to transition to a closed flow position;
cause one of the HP valve corresponding to the pump and the bleed valve corresponding to the pump to transition to an open flow position;
determine whether the HP conduit corresponding to the pump is pressurized based on the information generated by the corresponding one of the conduit feedback sensors;
determine, based on signals from the valve feedback sensors, an operational health of each of the valves of the manifold unit; and
abort, based on a determination that the operational health of one or more of the valves is unhealthy, operation of the manifold unit.

12. The apparatus of claim 11 wherein, with respect to each of the pumps, the controller is operable to determine whether the HP conduit corresponding to the pump is pressurized by comparing a predetermined threshold to the fluid pressure indicated by the information generated by the corresponding one of the conduit feedback sensors.

13. The apparatus of claim 11 wherein, with respect to each of the pumps, the controller is further operable to:
determine whether the LP valve corresponding to the pump is in the closed flow position; and
determine whether the one of the HP valve corresponding to the pump and the bleed valve corresponding to the pump is in the open flow position.

14. The apparatus of claim 11 wherein:
prior to causing the transition of the LP, HP, and/or bleed valves corresponding to each of the pumps, the controller is further operable to cause each of the pumps to commence operation; and prior to causing each of the pumps to commence operation, the controller is further operable to, with respect to each of the pumps:
- remotely control the LP, HP, and bleed valves corresponding to the pump by transmitting corresponding command signals to the LP, HP, and bleed valves to transition the LP, HP, and bleed valves to corresponding intended settings;
- after transmitting the command signals, receive corresponding feedback signals from the LP, HP, and bleed valves corresponding to the pump, wherein the feedback signals are indicative of corresponding actual settings of the LP, HP, and bleed valves; and
- assess an operational health of each of the LP, HP, and bleed valves corresponding to the pump based on the corresponding intended and actual settings.

15. The apparatus of claim 11 wherein the controller is further operable to, after causing the transitions of the LP valve and the one of the HP and bleed valves corresponding to each of the pumps, cause each of the pumps to operate at an increased flow output.

16. The apparatus of claim 11 wherein the plurality of conduit feedback sensors is a plurality of pressure sensors, wherein the apparatus further comprises a plurality of flow sensors in communication with the controller and each operable to generate information indicative of rate of fluid flow through a corresponding one of HP conduits, and wherein the controller is further operable to, with respect to each of the pumps, determine whether the HP conduit corresponding to the pump is substantially flushed based on the information generated by the corresponding one of the flow sensors.

17. The apparatus of claim 16 wherein, with respect to each of the pumps, the controller is further operable to determine whether the HP conduit corresponding to the pump is substantially flushed by comparing a predetermined threshold to the rate of fluid flow indicated by the information generated by the corresponding one of the flow sensors, and wherein the HP conduit is substantially flushed when the predetermined threshold is greater than the rate of fluid flow indicated by the information generated by the corresponding one of the flow sensors.

18. The apparatus of claim 16 wherein:
- the controller is further operable to cause each of the pumps to cease operation after determining that the HP conduits corresponding to each of the pumps are each substantially flushed; and
- after causing each of the pumps to cease operation, the controller is further operable to, with respect to each of the pumps:
  - remotely control the LP, HP, and bleed valves corresponding to the pump by transmitting corresponding command signals to the LP, HP, and bleed valves to transition the LP, HP, and bleed valves to corresponding intended settings;
  - after transmitting the command signals, receive corresponding feedback signals from the LP, HP, and bleed valves corresponding to the pump, wherein the feedback signals are indicative of corresponding actual settings of the LP, HP, and bleed valves; and
  - assess an operational health of each of the LP, HP, and bleed valves corresponding to the pump based on the corresponding intended and actual settings.

19. The apparatus of claim 11 wherein aborting the operation comprises aborting a depressurizing and flushing operation.

* * * * *